(12) United States Patent
Yamamoto et al.

(10) Patent No.: US 7,543,982 B2
(45) Date of Patent: Jun. 9, 2009

(54) SENSOR AND DISTURBANCE MEASUREMENT METHOD USING THE SAME

(75) Inventors: Yoshinori Yamamoto, Yokohama (JP); Itaru Sakabe, Yokohama (JP); Eisuke Sasaoka, Yokohama (JP); Hisashi Tanji, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 160 days.

(21) Appl. No.: 11/665,823

(22) PCT Filed: Sep. 29, 2006

(86) PCT No.: PCT/JP2006/319451
§ 371 (c)(1),
(2), (4) Date: Apr. 19, 2007

(87) PCT Pub. No.: WO2007/037366
PCT Pub. Date: Apr. 5, 2007

(65) Prior Publication Data
US 2008/0084914 A1 Apr. 10, 2008

(30) Foreign Application Priority Data
Sep. 29, 2005 (JP) ............................. 2005-283315
Oct. 31, 2005 (JP) ............................. 2005-316872

(51) Int. Cl.
*G01K 3/00* (2006.01)
(52) U.S. Cl. ............................. 374/131; 385/12; 356/32
(58) Field of Classification Search .................. 374/131, 374/137; 356/32; 385/12
See application file for complete search history.

(56) References Cited

U.S. PATENT DOCUMENTS 6,380,534 B1 * 4/2002 Farhadiroushan et al. .................... 250/227.14

(Continued)

FOREIGN PATENT DOCUMENTS

JP 4-134402 5/1992

(Continued)

OTHER PUBLICATIONS

International Preliminary Report on Patentability and Written Opinion of the International Searching Authority, issued in corresponding International Patent Application No. PCT/JP2006/319451, mailed on Apr. 10, 2008.

(Continued)

*Primary Examiner*—Andre J Allen
(74) *Attorney, Agent, or Firm*—McDermott Will & Emery LLP

(57) ABSTRACT

The present invention relates to a sensor or the like having a structure that enables accurate temperature measurement in a wide temperature range including a low-temperature region and is suitable for independently and accurately determining temperature variations and strains appearing in an object to be measured. The sensor comprises a laser light source, a sensor section that has a plurality of waveguides transmitting a laser light from the laser light source therethrough, a detecting section, and an analyzing section. The detecting section detects a plurality of Brillouin spectra obtained from the sensor section. The analyzing section determines at least one measurement value of a temperature in the sensor section and a strain generated in the sensor section, based on fluctuations of parameters defining the respective detected Brillouin spectra. In particular, the sensor section has a structure such that the variation of the Brillouin spectrum in response to a disturbance differs between the waveguides. Thus, by simultaneously monitoring the Brillouin spectra that varying a different manner in a plurality of waveguides, it is possible not only to measure accurately the temperature in a wide temperature range including a low-temperature region, but also to make distinction between the strain and temperature.

19 Claims, 19 Drawing Sheets

U.S. PATENT DOCUMENTS

| | | | |
|---|---|---|---|
| 7,113,659 B2* | 9/2006 | Taverner | 385/12 |
| 2004/0208413 A1 | 10/2004 | Scandale et al. | |
| 2005/0271317 A1* | 12/2005 | Taverner | 385/12 |
| 2006/0285850 A1* | 12/2006 | Colpitts et al. | 398/108 |
| 2007/0096007 A1* | 5/2007 | Anderson et al. | 250/200 |
| 2007/0171402 A1* | 7/2007 | Watley et al. | 356/73.1 |
| 2007/0223855 A1* | 9/2007 | Taverner | 385/12 |
| 2008/0068586 A1* | 3/2008 | Kishida et al. | 356/32 |
| 2008/0130707 A1* | 6/2008 | Yamamoto et al. | 374/131 |
| 2008/0145049 A1* | 6/2008 | Koyamada | 398/28 |
| 2008/0193126 A1* | 8/2008 | Yamamoto | 398/34 |

FOREIGN PATENT DOCUMENTS

| | | |
|---|---|---|
| JP | 2000-75174 | 3/2000 |
| JP | 2000-180265 | 6/2000 |
| JP | 2002-267425 | 9/2002 |

OTHER PUBLICATIONS

Nikles, Marc et al., "Brillouin Gain Spectrum Characterization in Single-Mode Optical Fibers"; Journal of Lightwave Technology, vol. 15, No. 10, Oct. 1997.

Technical Digest OFS-16, Tu2-2, Oct. 13-17, 2003; pp. 38-41.

Horiguchi, Tsuneo, et al.; "Development of a Distributed Sensing Technique Using Brillouin Scattering"; Journal of Lightwave Technology, vol. 13, No. 7, Jul. 1995; pp. 1296-1302.

OFS2000, 14th International Conference on Optical Fiber Sensors, FR2-1, SPIE vol. 4185, Oct. 11-13, 2000; pp. 651-661.

OFS20009, FR2-1, Oct. 11-13, 2000; pp. 651-661.

* cited by examiner

*Fig.2*

|  | PEAK FREQUENCY OF BRILLOUIN SPECTRUM | STRAIN COEFFICIENT | TEMPERATURE COEFFICIENT |
| --- | --- | --- | --- |
| FIBER A | 12,737MHz | 0.0565MHz/$\mu\varepsilon$ | 2.26MHz/°C |
| FIBER B | 12,539MHz | 0.0545MHz/$\mu\varepsilon$ | 1.55MHz/°C |
| FIBER C | 12,295MHz | 0.0527MHz/$\mu\varepsilon$ | 1.48MHz/°C |
| FIBER D | 12,537MHz | 0.0563MHz/$\mu\varepsilon$ | 1.54MHz/°C |
| FIBER E | 12,463MHz | 0.0548MHz/$\mu\varepsilon$ | 1.52MHz/°C |

(a)

Fig.10
(a)
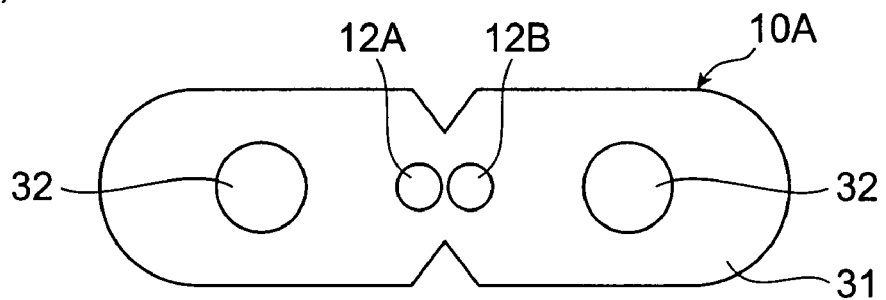
(b)
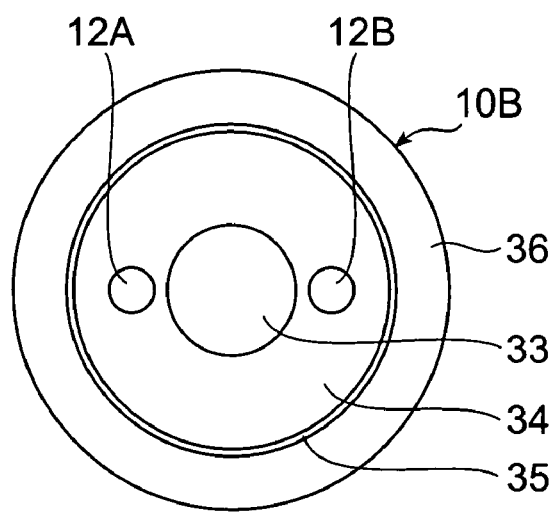
(c)
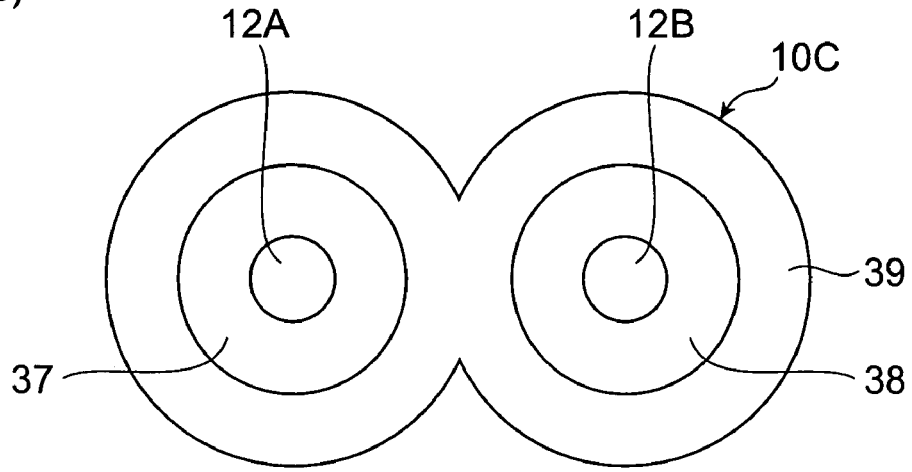

Fig.11
(a)
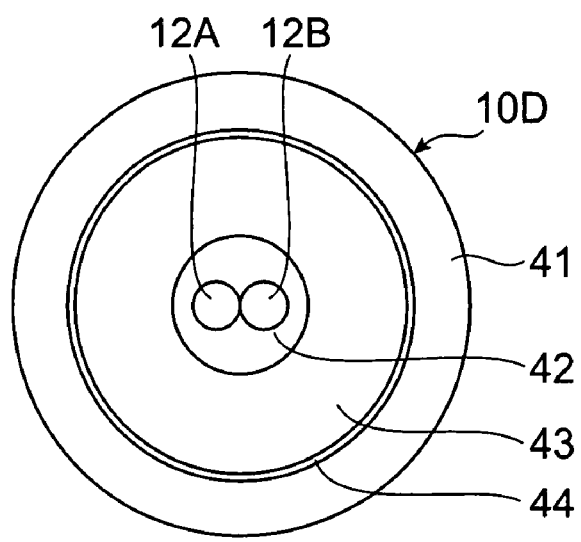
(b)
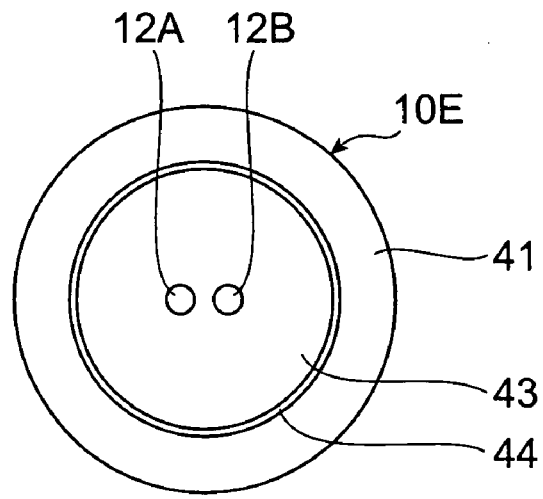

Fig.12
(a)
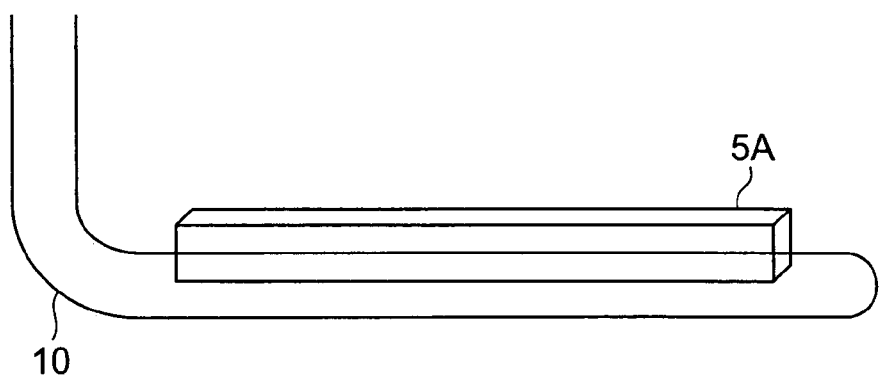
(b)
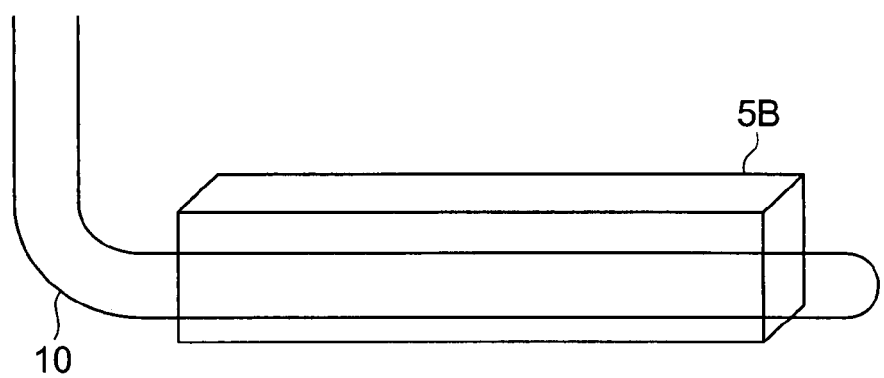
(c)
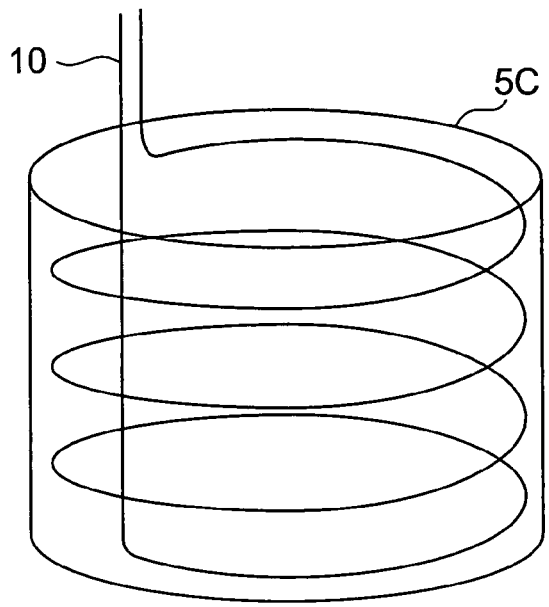

SENSOR AND DISTURBANCE MEASUREMENT METHOD USING THE SAME

RELATED APPLICATIONS

This application is a national phase of PCT/JP2006/319451 filed Sep. 29, 2006, which claims priority from Japanese Application No. 2005-283315 filed Sep. 29, 2005 and Japanese Application No. 2005-316872 filed Oct. 31, 2005, the disclosures of which Applications are incorporated by reference herein. The benefit of the filing and priority dates of the International and Japanese Applications is respectfully requested.

TECHNICAL FIELD

The present invention relates to a sensor for measuring at least one of temperature (or temperature distribution) of a waveguide and strain (or strain, distribution) occurring in a waveguide by using the waveguide through which a laser light, as a probe for detecting disturbances such as external forces or heat and for monitoring the spectrum of a Brillouin scattering light (hereinbelow called "Brillouin spectrum") outputted from the waveguide, propagates, and to a disturbance measurement method using such a sensor.

BACKGROUND ART

A device for using an optical fiber as a probe for detecting disturbances and measuring a temperature or strain of the optical fiber is known. Such a measurement device uses a technology of monitoring the spectrum of Brillouin scattering light detected from the optical fiber, and can measure a deformation or a temperature change of an object to be measured by attaching the optical fiber to the object to be measured or disposing the optical fiber in the vicinity of the object to be measured.

For example, Non-patent Document 1 discloses a technology for measuring a temperature of an object to be measured by which a predetermined monochromatic light is inputted into an optical fiber, a Brillouin spectrum obtained from the optical fiber is detected, and the temperature is measured on the basis of the information concerning the peak frequency of the detected Brillouin spectrum (hereinafter referred to as "peak frequency"). The Brillouin scattering is a nonlinear phenomenon of light being scattered by interaction of light and acoustic wave in an optical fiber.

The measurement technology described in Non-patent Document 1 is based on a sensing principle according to which the Brillouin spectrum obtained by detecting the Brillouin scattering light changes depending on the temperature of optical fiber. In particular, the Non-patent Document 1 describes that the peak frequency of the Brillouin spectrum changes linearly with temperature in a temperature region close to 230 to 370 K.

On the other hand, Non-patent Document 2 describes that a graph representing the relationship between the peak frequency and temperature in a temperature region close to 60 K to 90 K has an extremal value and the line width (hereinafter referred to as "spectral line width") of the Brillouin spectrum changes linearly with temperature.

In the field of strain measurements, for example, a strain gage using the dependence of electric resistance on strain is known for detecting strains generated as forerunners of abnormal states such as fracture or damage in a variety of structures. However, the problem associated with the measurement method using such a strain gage is that the measurements are easily affected by power loss or external electromagnetic interference. For this reason, strain measurements using the Brillouin scattering light in which an optical fiber or an optical fiber cable comprising an optical fiber was employed in a probe for disturbance detection have attracted attention in the field of such strain measurements. In particular, because strain measurements using the Brillouin scattering light are suitable for measuring strain distribution and enable measurements with a high resolution, they are expected to be used for deformation diagnostics of structures such as buildings and bridges. Such strain measurements using the Brillouin scattering light are based on a sensing principle according to which the peak frequency of Brillouin spectrum changes linearly with respect to the value of strain generated in the optical fiber cable by external forces.

For example, BOTDA (Brillouin Optical Time Domain Analysis) and BOCDA (Brillouin Optical Correlation Domain Analysis) are known as strain measurement methods using the Brillouin scattering light obtained from an optical fiber cable.

Patent Document 1 discloses as a strain detection probe an optical fiber cable in which an optical fiber and a wire material with a low thermal expansion are integrated by a coating material. This optical fiber cable is so configured that an optical fiber is integrated via the coating material with the wire having a low thermal expansion coefficient, thereby providing for high resistance to thermal expansion and thermal shrinkage and decreasing temperature disturbance. The strain measurements described in Patent Document 1 are assumed to be using the BODTA or the like. The BOTDA is a measurement method using backscattered light and has a distance resolution of about 1 m.

Further, Non-patent Document 3 describes a measurement method (BOCDA) that can realize a distance resolution of 10 cm or less with respect to the distance resolution of about 1 m attained with the BOTDA described in Patent Document 1. In both the BOTDA and the BOCDA, a two-end input system is necessary in which a probe light is inputted from one end of an optical fiber and a pump light is inputted from the other end of the optical fiber.

FIG. 1 shows a schematic configuration of a conventional strain measurement system of a BOCDA type using an optical fiber cable. The strain measurement system of a BOCDA type shown in the figure comprises a LD (laser diode) 101 serving as a light source, a coupler 102 that divides the light equally into two parts, an isolator 103 through which the light can pass in one direction but cannot pass in the opposite direction, an amplifier 104 that amplifies the light signals, a circulator 105 having three ports and serving for coupling to one port that is adjacent to another port, a PD (photodiode) 106, which is a light-receiving element, and an optical fiber cable 110 that includes only one optical fiber 111 serving as a light waveguide and functions as a sensor section. As described above, in the strain measurements based on the BOCDA method, a two-end input system is necessary in which a probe light is inputted from one end of the optical fiber 111 and a pump light is inputted from the other end of the optical fiber 111.

In the strain measurement system of the BOCDA type, the pump light and probe light are frequency modulated by cosine waves, and position resolution is performed by causing the induced Brillouin scattering only in a specific position (correlation peak). The Brillouin spectrum obtained by implementing frequency modulation of the generated pump light and probe light is a spectrum which comprises only the disturbance information in the position of the correlation peak where the pump light and probe light are correspondent in phase and the frequency difference between the two becomes constant. As a result, local strains can be measured.

Further, Non-patent Document 4 describes peak frequencies of Brillouin spectra in a variety of optical fiber cables and data concerning a temperature dependency, and a strain dependency (see FIG. 2).

Patent Document 1: Japanese Patent Application Laid-open No. 2001-12970

Non-patent Document 1: Marc Nikles, et al., "Brillouin gain spectrum characterization in Single-Mode optical fibers", JOURNAL OF LIGHTWAVE TECHNOLOGY, VOL. 15, NO. 10, October 1997

Non-Patent Document 2: L. Thevenaz, et al., "Brillouin gain spectrum characterization in optical fibers from 1 to 1000 K", Technical Digest, 16th International Conference on Optical Fiber Sensors, Oct. 13-17 (2003), Tu2-2, p. 38-41

Non-Patent Document 3: Hodate Kazuo, Arai Hiroshi, "Enlargement of measurement range by a temporal gating scheme in BOCDA fiber optic distributed strain sensing system of time-division pump-probe generation", TECHNICAL REPORT OF IEICE, OPE2004-224 (2005-02) (In Japanese)

Non-patent Document 4: Kellie Brown, et al. "Characterization of optical fiber for optimization of Brillouin scattering based fiber optic sensor", Optical Fiber Technology 11 (2005), p. 131-145

DISCLOSURE OF THE INVENTION

Problems that the Invention is to Solve

The present inventors have examined the above prior art, and as a result, have discovered the following problems. That is, in temperature measurements, Non-patent Document 2 teaches that the peak frequency of the Brillouin spectrum changes non-linearly with temperature in a low-temperature region of 200 K or less, including 60 K to 90 K. Therefore, the measurement technology of Non-patent Document 1 cannot uniquely determine the temperature with respect to the peak frequency of Brillouin spectrum obtained in a low-temperature environment.

From the description of Non-patent Document 2, the temperature is apparently measured by using a line width (spectral line width) of Brillouin spectrum. However, the spectral line width has a large measurement error and the temperature analysis using the spectral line width has poor accuracy.

On the other hand, in strain measurements, the BOTDA method descried in Patent Document 1 and the BOCDA method described in Non-patent Document 3 have poor operability during strain measurements because light is inputted to both ends of an optical fiber that serves as a disturbance detection probe. Thus, a two-end input structure is necessary for inputting a probe light from one end of the optical fiber and inputting a pump light from the other end of the optical fiber. As a result, in the case that an optical fiber cable having only one optical fiber is employed, one end of the optical fiber has to be looped as far as the installation end and the operability during installation is poor. Accordingly, the measurement range is narrow and the installation cost is high.

Further, an optical fiber cable including only one optical fiber is known to be affected by both the strains and the temperature. The strain amount of an order of about 1000 to 3000µε is usually measured in most cases and the peak frequency of the Brillouin spectrum changes by 50 to 180 MHz due to the strains, while these values vary depending on the deformation state of the object to be measured or required measurement accuracy. On the other hand, temperature measurements differ significantly depending on the environment use, but generally they are most often conducted in a temperature range of about 20 to 50° C., and the peak frequency changes by about 30 to 100 MHz due to temperature. Thus, in most cases the changes in the peak frequency of the Brillouin spectrum induced by strains and those induced by temperature are the same. As a result, the effect produced by strains on the optical fiber that is the disturbance detection probe is difficult to distinguish from that produced by temperature.

The present invention was been developed to resolve the problems described above. It is an object of the present invention to provide a sensor that enables accurate temperature measurement in a wide temperature range including a low-temperature region and has a structure for accurately determining the disturbance type such as temperature, strain, and so on, and also to provide a disturbance measurement method using the sensor.

Means for Solving the Problems

The sensor according to the present invention uses a waveguide in which one or more monochromatic light components propagate as a probe for detecting a disturbance such as an external force and heat, and then analyzes the generation position, type, and amount of the disturbance by monitoring the spectrum of Brillouin scattering light (Brillouin spectrum generated inside the waveguide). The sensor according to the present invention comprises a light source, a sensor section serving as a disturbance detection probe, a detecting section, and an analyzing section as the main components.

The light source is a laser light source that emits a laser light with a predetermined wavelength. The sensor section has at least first and second waveguides, each serving as a waveguide for transmitting part of the laser light from the laser light source. Here, the "waveguide" in the specification means a core region where the light substantially propagates and indicates a region constituted by the core region and an optical cladding region located around the core region. The detecting section detects the Brillouin scattering light outputted from the first and second waveguides in response to the input of the laser light. The analyzing section determines at least one measurement value of a temperature in the sensor section and a strain generated in the sensor section under the effect of disturbance, based on fluctuations of parameters defining the respective Brillouin spectra of the first and second waveguides detected by the detecting section.

The sensor section has a structure for causing the variations in the Brillouin spectrum obtained correspondingly to the disturbance to differ between the first and second waveguides. As one of the structures that causes the variations of Brillouin spectrum to differ between the plural waveguides, dissimilar waveguides, which have respectively different Brillouin scattering characteristics, more specifically demonstrate different variations in the Brillouin spectrum under the effect of the same disturbance, may be employed as the first and second optical fibers. Another structure for causing the difference in variations of the Brillouin spectrum between the plural waveguides may employ a plurality of waveguides having the same the Brillouin scattering characteristic and have a structure that causes different disturbance effects to be applied to the waveguides. In any of the above-described cases, the Brillouin spectra demonstrating different changes in response to a disturbance applied to the sensor section can be monitored at the same time.

The parameters defining the Brillouin spectrum include a peak frequency of the Brillouin spectrum (peak frequency) and a line width of the spectrum (spectral line width). Furthermore, the laser light source may have a structure outputting outputs a laser light with a first wavelength that is guided to the first waveguide, and a laser light with a second wavelength different from the first wavelength that is guided to the second waveguide.

The sensor section may include first and second optical fibers, and each of the first and second optical fibers has a core region extending along a predetermined axis and a cladding region provided on the outer periphery of the core region. In this case, the core region of the first optical fiber corresponds to the aforementioned first waveguide. The core region of the second optical fiber corresponds to the aforementioned second waveguide.

The sensor section may include an optical fiber having a plurality of core regions, and a first core region of the plural core regions corresponds to the aforementioned first waveguide and a second core region corresponds to the aforementioned second waveguide. The cladding region is provided so as to cover these first and second core regions. In this case, the cladding region functions as a holding structure for maintaining the relating positions of the first and second waveguide in the longitudinal direction.

The first and second waveguides in the sensor section that serve as the waveguides having different Brillouin scattering characteristics have Brillouin scattering characteristics that differ in temperature dependency of the peak frequency of the Brillouin spectrum. In particular, in order to enable accurate temperature measurements in a low-temperature region below 200 K, the first and second waveguides in the sensor section preferably have Brillouin scattering characteristics such that the extremal temperatures in the graph that represents the temperature dependency concerning the peak frequency are different from each other. Furthermore, the first and second waveguides in the sensor section may have Brillouin scattering characteristics that differ in temperature dependency concerning the spectral line width in the Brillouin spectrum.

The sensor section may have a holding structure for holding both the first waveguide and the second waveguide along a predetermined direction. In particular, the holding structure of the sensor section preferably has a loop configuration for optically connecting one end of the first waveguide opposing the other end of the first waveguide where part of the laser light is inputted to one end of the second waveguide opposing the other end of the second waveguide where part of the laser light is inputted. In this case, the operability, e.g., in sensor section installation on the object to be measured, is greatly improved.

The sensor section may also have a holding structure for holding the first and second waveguides, such that substantially identical strains are generated in the first and second waveguides when an external force is applied. In this case, the holding structure of the sensor section includes a strength member extending along a longitudinal direction of the first and second waveguides, and a coating layer integrally covering the first and second waveguides together with the strength member.

On the other hand, as a structure for accurately distinguishing the variations in the Brillouin spectrum caused by temperature and strains, the sensor section may have a holding structure for holding the first and second waveguides, such that at least one of temperature changes in the sensor section and strains generated in the sensor section differs between the first and second waveguides (another structure causing the variation in the Brillouin spectrum to differ between a plurality of waveguides).

In this case, the holding structure of the sensor section, which serves as a structure causing the effect of disturbance to differ between the first and second waveguides, may include a loose structure such that one of the first and second waveguides is held so that it can move in at least one direction from the longitudinal direction and radial direction thereof. As a means for implementing such a loose structure, the holding structure of the sensor section preferably includes one of a metal or resin tube and a tube filled with a resin, the included tube accommodating one of the first and second waveguides. The holding structure of the sensor section, which serves as another structure that causes the effect of disturbance to differ between the first and second waveguides, may include a thermally insulating material covering the outer periphery of one of the first and second waveguides.

The sensor may have a holding structure that can partially separate the first optical fiber and second optical fiber. In this case, the above-described loop structure can be easily implemented.

The analyzing section determines at least one measurement value of a temperature in the sensor section and strains generated in the sensor section, based on fluctuations of parameters defining the respective Brillouin spectra of the first and second waveguides detected by the detecting section. More specifically, the analyzing section extracts the peak frequency or frequency shift of the Brillouin spectra caused by a disturbance applied to the sensor section, based on the Brillouin spectra of the first and second waveguides detected by the detecting section and then determines the physical quantity corresponding to at least one of the temperature in the sensor section and strains generated in the sensor section on the basis of the extracted frequency information. Furthermore, the analyzing section extracts the variation of spectral line width caused by a disturbance applied to the sensor section, based on the Brillouin spectra of the first and second waveguides detected by the detecting section, and then determines the physical quantity corresponding to at least one of the temperature in the sensor section and strains generated in the sensor section, based on the extracted line width variation.

The disturbance measurement method according to the present invention is implemented by using the sensor having the above-described configuration. More specifically the disturbance measurement method comprises a laser light irradiation step, a detection step, and an analysis step. In the laser light irradiation step, a laser light with a predetermined wavelength, which is emitted from the laser light source, is guided to the first and second waveguides included in the sensor section. In the detection step, the Brillouin spectra outputted from the first and second waveguides according to the input of the laser light are detected with the detecting section. In the analysis step, a measurement value of at least one of the temperature in the sensor section and strains generated in the sensor is determined by the analyzing section, based on the fluctuations of parameters defining the Brillouin spectra of the first and second waveguides detected by the detecting section.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

Effects of the Invention

In accordance with the sensor and disturbance detection method according to the present invention, accurate temperature measurements can be performed within a wider temperature range including a low-temperature region of below 200 K, and disturbance types affecting the sensor section can be accurately detected (measured) by monitoring the spectra of Brillouin scattering light obtained from a plurality of waveguides with different Brillouin scattering characteristics that are used as a disturbance detection probe.

BRIEF DESCRIPTION OF THE DRAWINGS

FIG. 2 is a table showing data concerning a peak frequency, a temperature dependency, and a strain dependency of Brillouin spectra of various optical fibers;

FIG. 10 is a cross-sectional view showing various structures of optical fiber cables for use in the sensor section of the sensor according to the present invention (Part 1);

FIG. 11 is a cross-sectional view showing various structures of optical fiber cables for use in the sensor section of the sensor according to the present invention (Part 2);

FIG. 12 shows an installation example of the sensor section (optical fibers) of the sensor according to the present invention;

Figure 1:
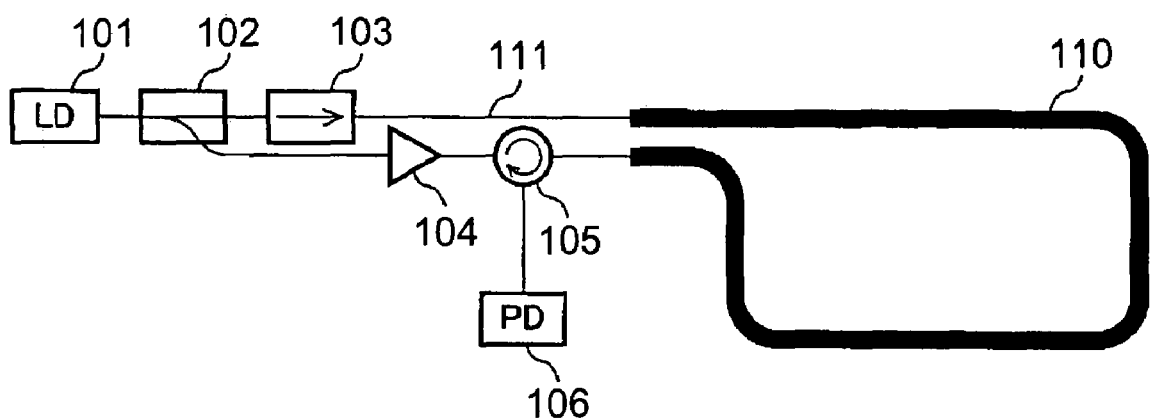
FIG. 1 shows a schematic configuration of the conventional strain measurement system based on the BOCDA method using an optical fiber cable.

DESCRIPTION OF THE REFERENCE NUMERALS 10, 10A-10K, 50 . . . optical fiber cable (sensor section); 1-3 . . . sensor; 5 . . . object to be measured; 11, 42 . . . coating; 12, 12A, 12B . . . optical fiber; 13 . . . BOTDR device; 14 . . . temperature analyzing section; 15, 101 . . . laser light source (LD); 16, 106 . . . detecting section (PD); 17 . . . storage section; 18 . . . extracting section; 19 . . . determining section; 21 . . . strain analyzing section; 22 . . . strain storage section; 23 . . . computing section; 24 . . . strain extracting section; 25 . . . strain determining section; 51, 122 . . . cladding region; 52, 121 . . . core region; 61 . . . analyzing section; 62, 102 . . . coupler; 63, 103 . . . isolator; 64, 104 . . . optical amplifier; 65, 105 . . . circulator; 32, 33, 72A, 72B, 82A, 82B, 92A, 92B . . . strength member; 73, 83, 93 . . . notch; 84 . . . resin tube; 85 . . . metal tube; 86 . . . buffer filling; 31, 36, 39, 71, 81A, 81B, 91A, 91B . . . cable jacket; 35 . . . binding tape; 37, 38 . . . strength member yarn; and 94 . . . thermally insulating member.

Best Modes for Carrying Out the Invention

In the following, embodiments of the sensor and disturbance measurement method according to the present invention will be explained in detail with reference to FIGS. 3 to 9. In the description of the drawings, identical or corresponding components are designated by the same reference numerals, and overlapping description is omitted.

Figure 3:
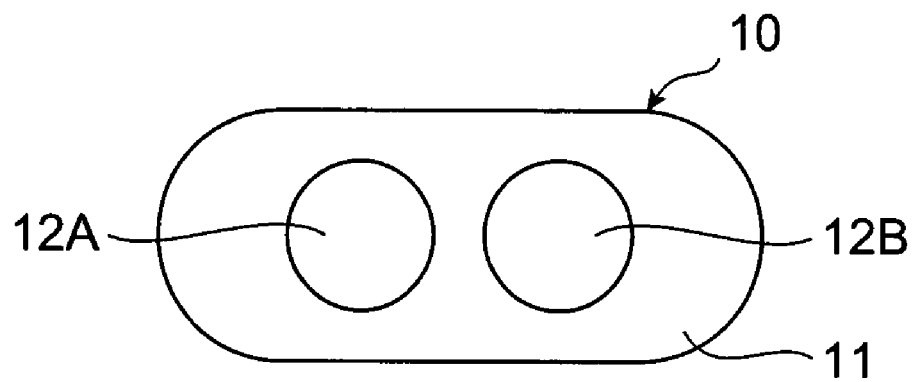
FIG. 3 is a cross-sectional view showing the basic structure of the optical fiber cable employed in the sensor section of the sensor according to the present invention.

First, an optical fiber cable will be explained with reference to FIG. 3 as a representative application example of a sensor section (disturbance detection probe) of the sensor according to the present invention. FIG. 3 is a cross-sectional view showing the basic structure of an optical fiber cable 10 employed in a sensor section of the sensor according to the present invention. As shown in the area (a) of FIG. 3, the optical fiber cable 10 employed as a disturbance detection probe comprises two optical fibers 12A, 12B and a cable external coating 11 that integrally covers the optical fibers 12A, 12B. As shown in the area (b) in FIG. 3, each of the two optical fibers 12A, 12B comprises a core region 121 extending along the predetermined axis and a cladding region 122 provided on the outer periphery of the core region 121, and the core region 121 functions as an optical waveguide.

When a laser light with a predetermined wavelength is inputted into the core regions 121 of optical fibers 12A, 12B, the Brillouin scattering light is outputted from the optical fibers 12A, 12B. The Brillouin scattering light is generated as follows. When the pump light propagates inside the optical fiber, an acoustic wave is generated in the optical fibers by the pump light. Due to interaction of the pump light and acoustic wave, a scattered light (Stokes light) that is down converted in the direction inverted with respect to the propagation direction of the pump light is generated. This scattered light is the Brillouin scattering light.

The spectrum of the Brillouin scattering light (Brillouin spectrum) is represented by the Lorentz spectrum described by the following formula (1).

[Formula 1]

$$g_B(\nu) = \frac{g_0}{1 + \{2(\nu - \nu_B)/\Delta\nu_B\}^2} \quad (1)$$

This formula (1) represents the intensity of Brillouin spectrum at a certain frequency $\nu$. In the formula, $g_0$, $\nu_B$, and $\Delta\nu_B$ are parameters defining the Brillouin spectrum, they represent the spectral intensity peak, spectral peak frequency, and spectral line width of the Brillouin spectrum.

Figure 4:
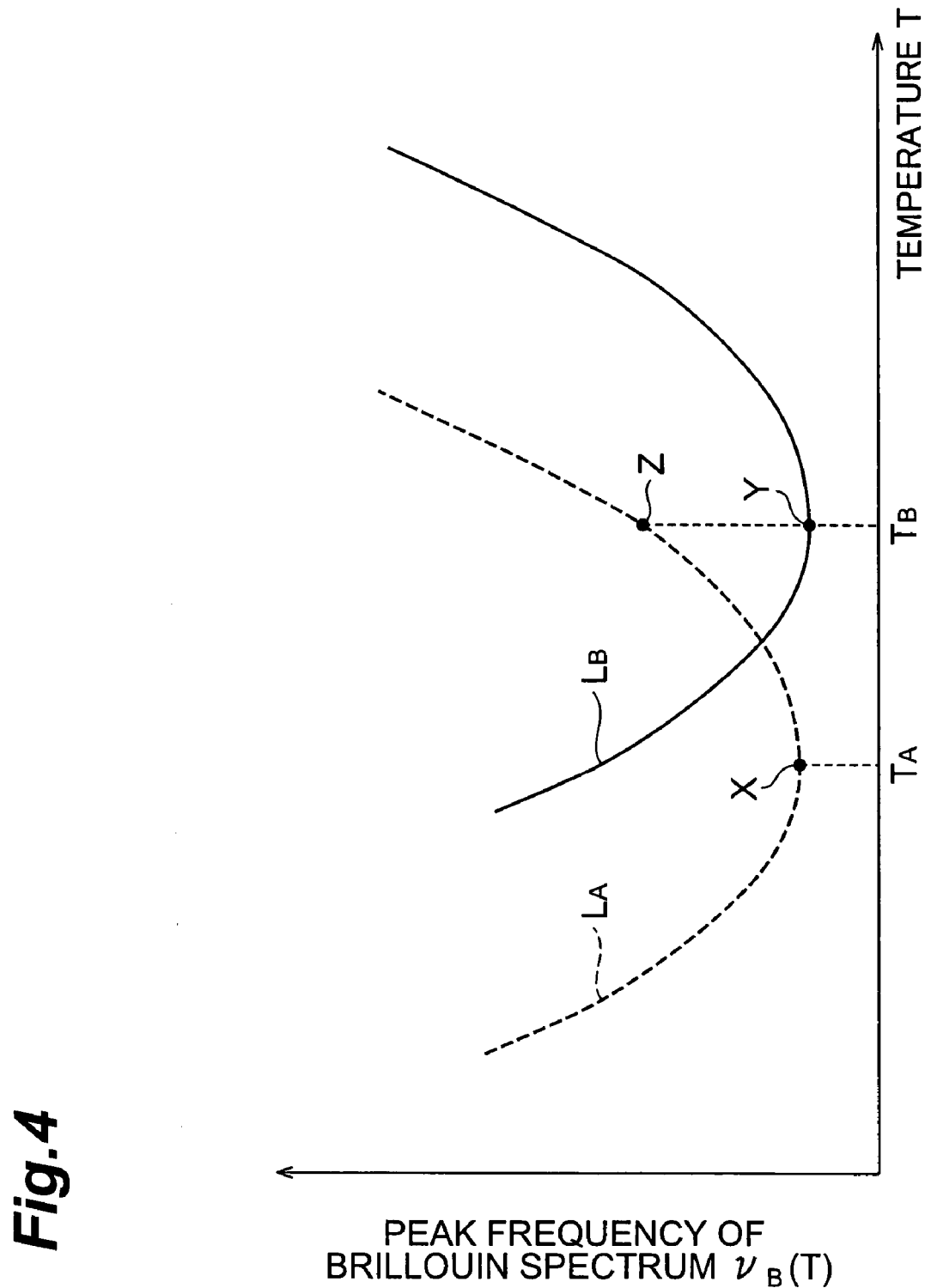
FIG. 4 is a graph showing the temperature dependency of peak frequency of the core region in the optical fiber included in the sensor section.

The Brillouin spectrum changes depending on the temperature of optical fibers 12A, 12B. FIG. 4 is a graph showing a temperature characteristic of peak frequency $\nu_B$ for the Brillouin spectra obtained from the optical fibers 12A, 12B included in the sensor section. In FIG. 4, a temperature T is plotted against the abscissa, and a peak frequency $\nu_B$ (T) of the Brillouin spectra obtained from the optical fibers 12A, 12B. The temperature range on the abscissa is a low-temperature region below 200 K, including 60 K to 90 K. In the graph the curve $L_A$ represents a peak frequency $\nu_B$ (T) of the Brillouin spectrum of the optical fiber 12A, and the curve $L_B$ represents a peak frequency $\nu_B$ (T) of the Brillouin spectrum of the optical fiber 12B.

The peak frequencies $\nu_B$ (T) of the Brillouin spectra of the optical fibers 12A, 12B have different extremal values close to 60 to 90 K, and change non-linearly at a temperature T in a low-temperature range of about 200 K and below. Thus, the peak frequency $\nu_B$ (T) of the Brillouin spectrum shows a small variation ratio with respect to temperature T at a temperature close to 60 to 90 K, and in a low-temperature region other than that close to 60 to 90 K, the variation ratio of the peak frequency $\nu_B$ (T) with respect to temperature T is larger.

The curve $L_A$ has a extremal value represented by point X at a extremal temperature $T_A$. Furthermore, the curve $L_B$ has a extremal value represented by point Y at an extremal temperature $T_B$. For example, where a pump light is inputted into the optical fiber cable 10 when the optical fiber cable 10 is at the extremal temperature $T_B$, a Brillouin scattering light with a peak frequency of Brillouin spectrum changed by the value represented by point Z is outputted from the optical fiber 12A and a Brillouin scattering light with a peak frequency of Brillouin spectrum changed by the value represented by point Y is outputted from the optical fiber 12B.

Thus, the optical fiber cable 10 comprises the optical fibers 12A, 12B that differ from each other in the temperature at which an extremal value is assumed in the peak frequency $\nu_B$ (T) of the Brillouin spectrum with respect to temperature. Thus, the optical fiber cable 10 is configured of the optical fibers 12A, 12B having respectively different Brillouin scattering characteristics (different Brillouin spectrum with respect to temperature characteristics).

In order to obtain the different temperatures at which the peak frequency $\nu_B$ (T) of the Brillouin spectrum with respect to temperature assumes an extremal value in the optical fibers 12A, 12B, the dopant type, dopant concentration, and refractive index profile can be changed in the optical fibers 12A, 12B. For example, the concentration of dopant in the core region 121 of the optical fiber 12A is 0 and the extremal temperature $T_A$ is about 60 K. In the optical fiber 12B, the concentration of dopant in the core region 121 is 20% and the extremal temperature $T_B$ is about 90 K.

FIRST EMBODIMENT OF SENSOR

Figure 5:
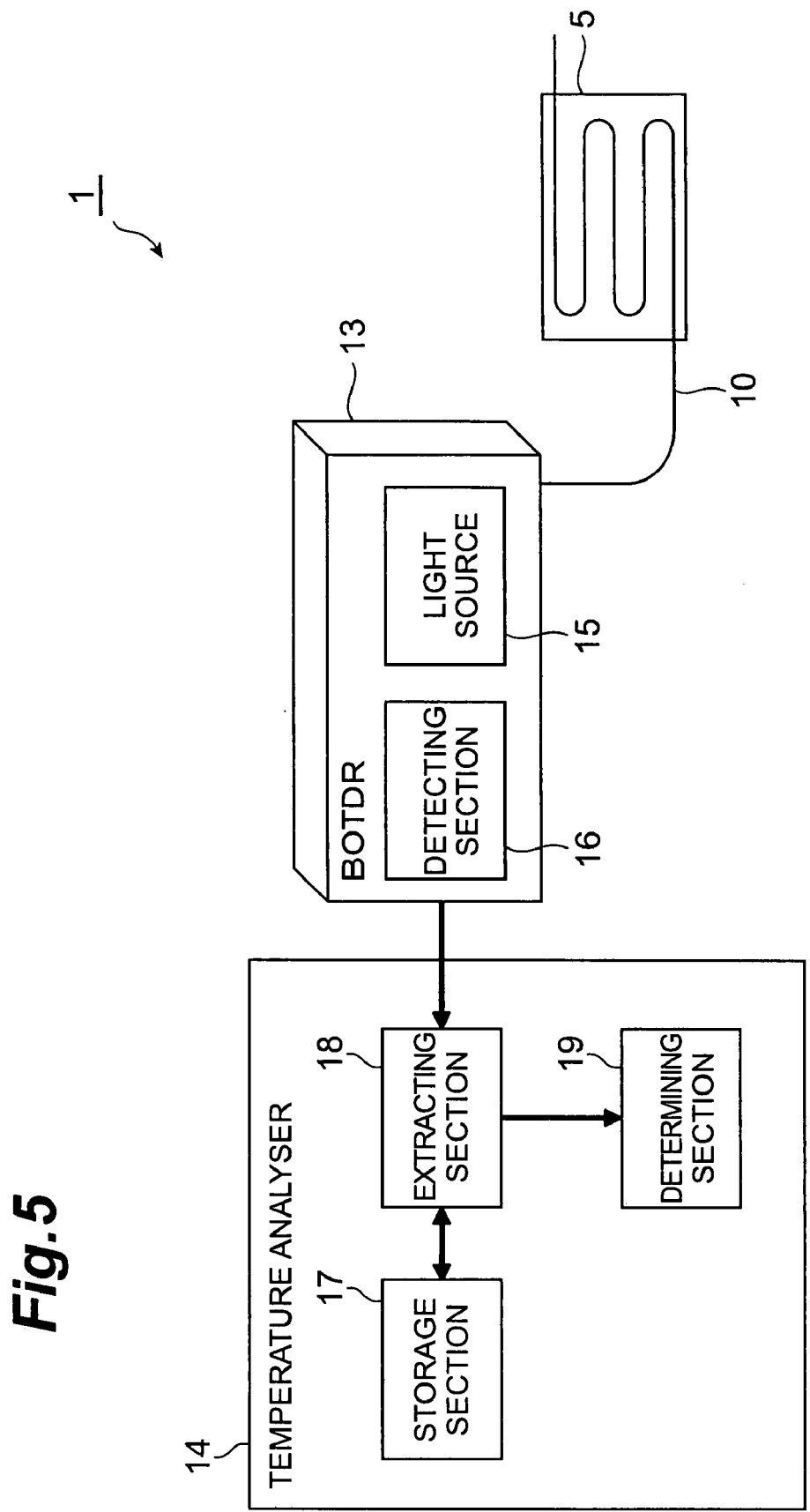
FIG. 5 shows the configuration of the first embodiment of the sensor according to the present invention.

A sensor according to the first embodiment that comprises the optical fiber cable 10 having the above-described structure as a disturbance detection probe will be explained below. FIG. 5 shows the configuration of the first embodiment of the sensor according to the present invention. The temperature measurements employed with the sensor according to the first embodiment will be explained below in greater detail. A sensor 1 according to the first embodiment shown in FIG. 5 comprises the optical fiber cable 10 employed as a sensor section, a BOTDR (Brillouin Optical Time Domain Reflectometry) device 13, and a temperature analyzing section 14 (analyzing means) and serves to measure the temperature of an object to be measured 5. As described above, the optical fiber cable comprises optical fibers 12A, 12B, and these optical fibers 12A, 12B have core sections of waveguides of two types having different Brillouin scattering characteristics.

The BOTDR device 13 comprises a light source 15 and a detecting section 16. One end of the optical fiber cable 10 is connected to the BOTDR device 13, and the Brillouin scattering light outputted from the optical fibers 12A, 12B included in the optical fiber cable 10 is measured as a function of time.

The core regions of the optical fibers 12A, 12B included in the optical fiber cable 10 input the pump light outputted by the light source 15 and also output the backscattered light including the Brillouin scattering light. The optical fiber cable 10 is disposed such that part of the optical fiber cable 10 is in contact with the surface of the object to be measured 5. In the first embodiment, the optical fiber cable 10 is disposed at the surface of the object to be measured 5 in a tortuous manner.

In the case that the arrangement of the optical fiber cable 10 is disposed in such a manner, the larger part of the optical fiber cable 10 comes into contact with the object to be measured 5. The optical fibers 12A, 12B are held so that as to have almost the same temperature along the longitudinal direction of the optical fiber cable 10.

The detecting section 16 detects a spectrum of Brillouin scattering light outputted from pump light input end surfaces (end surfaces of core regions of optical fibers 12A, 12B) of optical fibers 12A, 12B included in the optical fiber cable 10 for each unit time. The detecting section 16 outputs the detection result representing the peak frequency in the detected Brillouin spectrum to a temperature analyzing section 14. Thus, the detecting section 16 outputs a first detection result corresponding to the optical fiber 12A and a second detection result corresponding to the optical fiber 12B. The peak frequency of the Brillouin spectrum varies according to the frequency of the pump light. Furthermore, the frequency of the pump light varies depending on the temperature of the light source or the like. As a result, the measurement accuracy can be increased by taking the peak frequency of the Brillouin spectrum as a difference in frequency with the pump light frequency (frequency shift).

The temperature analyzing section 14 analyzes the temperature of environment in which the optical fiber cable 10 is disposed, that is, the temperature of the object to be measured 5, based on the first detection result and second detection result outputted from the detecting section 16. The temperature analyzing section 14 comprises a storage section 17, an extracting section 18, and a determining section 19.

The storage section 17 associates and stores the first shift information and second shift information indicating the difference between the pump light frequency and peak frequency of the Brillouin spectrum (hereinafter referred to as "frequency shift") with respect to the temperature information indicating the temperature.

Figure 6:
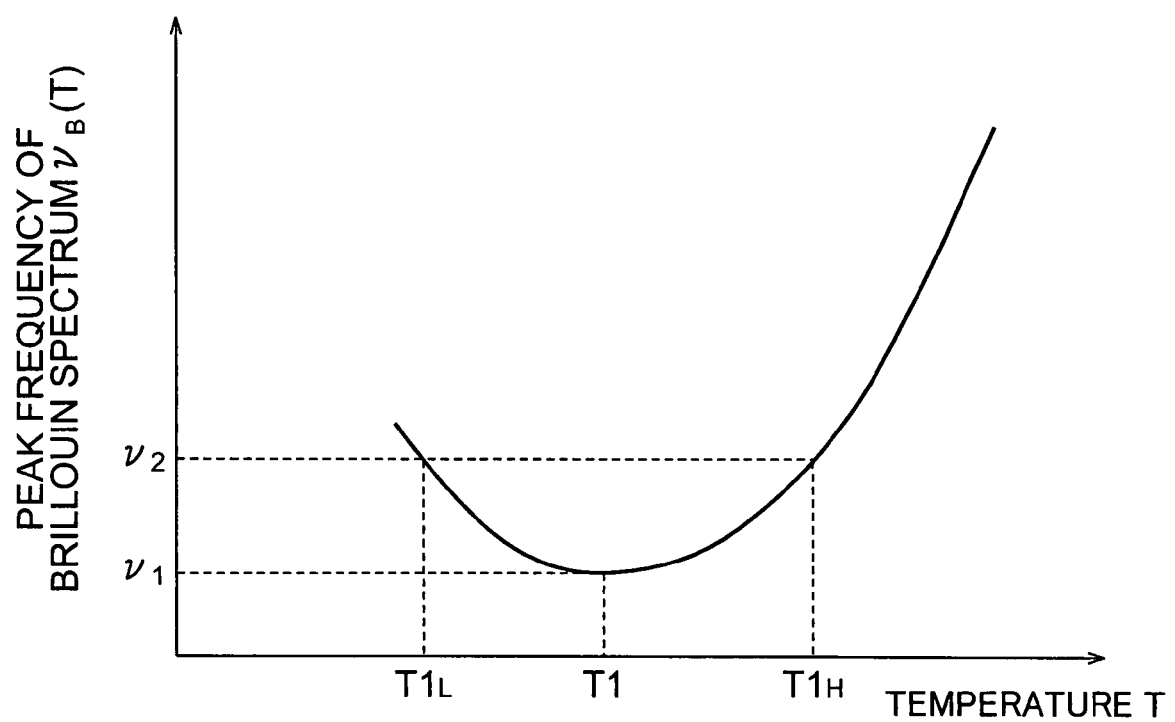
FIG. 6 is a graph showing the temperature dependency of peak frequency of the Brillouin spectrum of the core region in the optical fiber that is included in the sensor section (optical fiber cable) of the sensor according to the first embodiment.

The information stored by the storage section 17 will be explained below in greater detail with reference to FIG. 6. FIG. 6 is a graph showing a temperature characteristic of the frequency shift of Brillouin spectrum of the optical fiber 12A employed in the sensor section of sensor 1 according to the first embodiment. In the temperature characteristic graph shown in FIG. 6, when the frequency shift $v_1$ assumes a minimum value, one temperature T1 corresponds to one frequency shift $v_1$. Further, in the temperature characteristic graph shown in FIG. 6, even in a temperature range above $T1_H$, there is a region in which only one temperature corresponds to one frequency shift. In such cases, one temperature information t1 associated with the first shift information indicating one frequency shift $v_1$ of the Brillouin spectrum will be stored in the storage section 17 with respect to the optical fiber 12A.

In the temperature characteristic shown in FIG. 6, two temperatures $T1_L$, $T1_H$ correspond to a frequency shift $v_2$. In this case, two types of temperature information $t1_L$, $t1_H$ associated with the first shift information indicating one frequency shift $v_2$ will be stored in the storage section 17 with respect to the optical fiber 12A. Likewise, with respect to the optical fiber 12B, when one frequency shift of Brillouin spectrum and one temperature correspond to each other, one temperature information t2 associated with the second shift information indicating one frequency shift of the Brillouin spectrum will be stored. Further, when two temperatures correspond to one value of the frequency shift of Brillouin spectrum, two types of temperature information $t2_L$, $t2_H$ associated with the second shift information indicating one frequency shift of the Brillouin spectrum will be stored.

Returning to FIG. 5, the extracting section 18 extracts temperature information of one to two types stored in the storage section 17 in a state where the first and second types of shift information that respectively correspond to the first and second detection results outputted from the detecting section 16 are associated. The extracting section 18 then outputs the extracted temperature information to the determining section 19.

The determining section 19 determines the temperature of the optical fiber cable 10 on the basis of the outputted temperature information. When one temperature information t1 relating to the optical fiber 12A and one temperature information t2 relating to the optical fiber 12B are outputted from the detecting section 18, then the determining section 19 determines the average value of the temperature T1 indicated by the temperature information t1 and the temperature T2 indicated by the temperature information t2 as the temperature of the optical fiber cable 10. When one temperature information t1 relating to the optical fiber 12A and two types of temperature information $t2_L$, $t2_H$ relating to the optical fiber 12B are outputted, the determining section 19 determines the average value of the temperature T1 indicated by the temperature information t1 and the temperature of the temperature information $t2_L$, $t2_H$ that is closer to the temperature t1 as the temperature of the optical fiber cable 10.

When two types of temperature information $t1_L$, $t1_H$ relating to the optical fiber, 12A and one temperature information t2 relating to the optical fiber 12B are outputted, the determining section 19 determines the temperature of the optical fiber cable 10 by the process identical to the above-described determination process. Further, when two types of temperature information $t1_L$, $t1_H$ relating to the optical fiber 12A and two types of temperature information $t2_L$, $t2_H$ relating to the optical fiber 12B are outputted, the determining section 19 determines the average value of the matching temperatures or the temperatures that are closer to one another as the temperature of the optical fiber cable 10. The determining section 19 analyzes the temperature of the object to be measured 5 on the basis of the determined temperature of the optical fiber cable 10.

Figure 7:
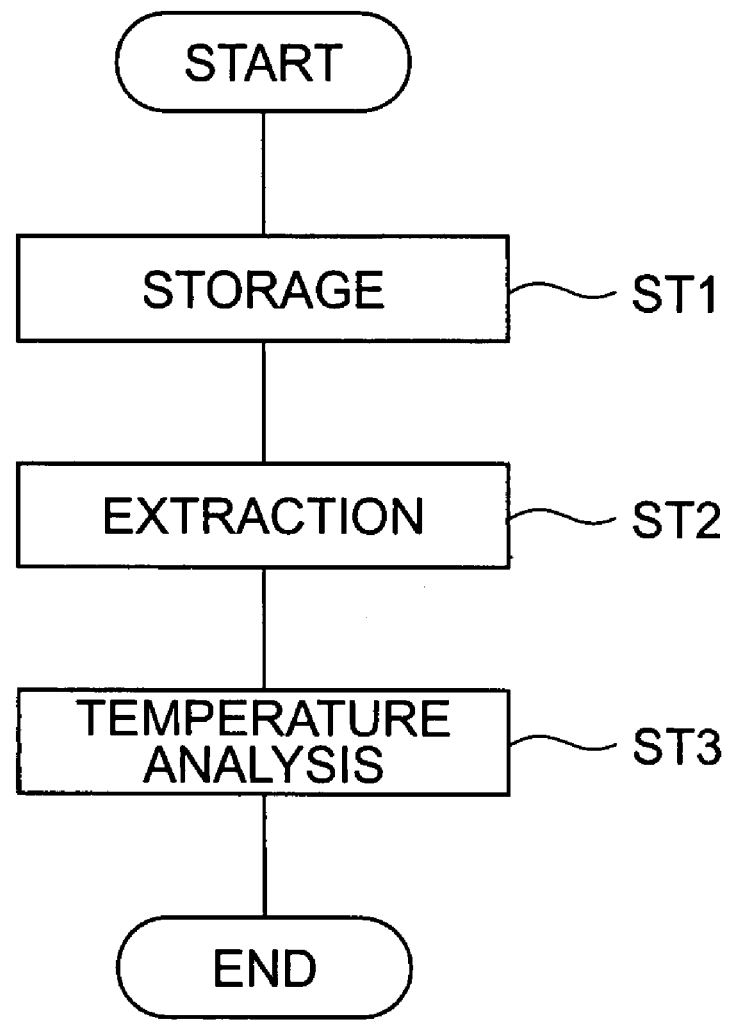
FIG. 7 is a flowchart for explaining the temperature measurement method (first embodiment of the disturbance measurement method according to the present invention) that uses the sensor according to the first embodiment.

The operation of the sensor 1 according to the first embodiment, in particular the method for measuring a temperature (first embodiment of the disturbance measurement method according to the present invention) will be explained below with reference to FIG. 7. FIG. 7 is a flowchart for explaining the method for measuring temperature by using the sensor 1 according to the first embodiment. In the disturbance measurement method according to the first embodiment, the temperature of the object to be measured 5 is measured by using the sensor 1.

The disturbance measurement method according to the first embodiment comprises a storage step ST1, a detection step ST2, and a temperature analysis step ST3 and analyzes the temperature of the object to be measured 5. In the storage step ST1, the temperature information and the first shift information and second shift information that correspond to this temperature are stored in advance in a mutually associated state in the storage section 17.

The detection step ST2 and temperature analysis step ST3 are executed in a state in which the temperature information and the first and second shift information are stored by the storage section 17. First, in the detection step ST2, pump light is inputted into the optical fibers 12A, 12B, and the Brillouin spectra obtained from the optical fibers 12A, 12B in response to the input of the pump light are detected by the detecting section 16. The first detection result and second detection result that indicate the frequency shifts of respective detected Brillouin spectra of the optical fiber 12A and optical fiber 12B are outputted by the detecting section 16 to the temperature analyzing section 14.

In the temperature analysis step ST3, the first and second shift information corresponding to the first and second detection results and the first and second temperature information stored in the storage section 17 in a state of respective association therewith are extracted by the extracting section 18. The temperature of the optical fibers 10 is determined by the determining section 19 on the basis of the extracted temperature information, and the temperature of the object to be measured 5 is analyzed on the basis of the determined temperature.

As described above, in the sensor 1 according to the first embodiment and the temperature measurement method (disturbance measurement method according to the first embodiment) using such a sensor, the Brillouin spectra obtained from a plurality of waveguides with mutually different Brillouin spectrum with respect to temperature relationships (the waveguides may be a plurality of core regions held by a common cladding region, or core regions of a plurality of respective optical fibers) are detected by the detecting section 16. The temperature of the optical fiber cable 10 is then determined on the basis of fluctuations of parameters defining the detected Brillouin spectrum. Therefore, the temperature of the object to be measured can be accurately analyzed even in a low-temperature region of 200 K and below.

With the conventional technology using only one optical fiber as a disturbance detection probe, when the frequency shift of Brillouin spectrum of the optical fiber assumes an extremal value in a temperature characteristic graph at a temperature close to the temperature of the object to be measured 5, the temperature cannot be uniquely analyzed only from the frequency shift obtained from this optical fiber. In contrast, in the present embodiment, temperature analysis is performed on the basis of the frequency shift obtained from the optical fiber 12A and optical fiber 12B. Therefore, accurate temperature analysis is possible even in the temperature range comprising a low-temperature range of 200 K and below.

Further, the frequency shift of the Brillouin spectrum assumes an extremal value at a temperature close to the temperature of the object to be measured 5 only in one of the optical fiber 12A and optical fiber 12B. Therefore, even when the variation rate of the frequency shift of Brillouin spectrum with respect to temperature obtained from one optical fiber is small (when sensitivity is poor), the temperature can be accurately measured by performing temperature analysis on the basis of the frequency shift detected with good sensitivity with respect to temperature, this frequency shift being obtained from the other optical fiber.

Modification Example of the Sensor According to the First Embodiment

In the disturbance measurement method and sensor 1 according to the above-described first embodiment, the temperature was measured by using the temperature dependency of the frequency shift of Brillouin spectrum, but the temperature can be also measured by using the temperature dependency of the spectral line width of Brillouin spectrum. In this case, the functions of each element of the sensor 1 shown in FIG. 5 are different from those according to the first embodiment in the aspects as follows.

The detecting section 16 outputs the detection results indicating the spectral line width of the detected Brillouin spectrum to the temperature analyzing section 14. Thus, the detecting section 16 outputs the first detection result corresponding to the optical fiber 12A and the second detection result corresponding to the optical fiber 12B.

The temperature analyzing section 14 analyzes the temperature of the object to be measured 5 on the basis of the first and second detection results outputted from the detecting section 16.

The storage section 17 stores the temperature information indicating the temperature in a state in which this information is associated with the first line width information and second line width information. The first and second line width information means the spectral line width of the Brillouin spectrum obtained from the optical fiber 12A and optical fiber 12B, respectively, at the temperature indicated by the associated temperature information. The spectral line width obtained from the optical fibers 12A, 12B changes linearly with temperature. As a result, the storage section 17 stores the first line width information indicating one line width and the temperature information t1 indicating one temperature in an associated state thereof and also stores the second line width information indicating one spectral line width and the temperature information t2 indicating one temperature in an associated state thereof.

The detecting section 18 extracts the temperature information t1, t2 stored by the storage section 17 in a state in which this information is associated respectively with the first and second line width information corresponding to the first and second detection results outputted from the detecting section 16. Further, the extracting section 18 outputs the extracted temperature information t1, t2 to the determining section 19.

The determining section 19 determines the temperature of the optical fiber cable 10 on the basis of the outputted temperature information t1, t2. When the temperature information t1 and temperature information t2 are outputted from the extracting section 18, the determining section 19 determines the average value of the temperature T1 indicated by the temperature information t1 and the temperature T2 indicated by the temperature information t2 as the temperature of the optical fiber cable 10. The determining section 19 analyzes the temperature of the object to be measured 5 on the basis of the temperature of the determined optical fiber cable 10.

Thus, the temperature measurement method using the modification example of the sensor 1 according to the first embodiment, in the temperature analysis step ST3, performs the temperature analysis by using information relating to a plurality of spectral line widths that do not depend on the amount of strain in the optical fibers 12A, 12B, and therefore, the temperature can be measured with higher accuracy.

Further, the temperature analysis for the object to be measured 5 may be conducted by using a spectral line width even in the case where the temperature measurement range is wider than the low-temperature region, or when the temperature measurement range includes a temperature region in which the spectral line width of the Brillouin spectrum does not change linearly with temperature. In this case, temperature analysis is carried out by the measurement method identical to that of the first embodiment in which the temperature analysis is carried out by using the frequency shift of the Brillouin spectrum. Thus, when a plurality of temperature information types are extracted with respect to one detection result of the first detection result and second detection result, the average value of the temperature indicated by one temperature information corresponding to the first detection result and the temperature indicated by one temperature information corresponding to the second detection result that indicate the same or close values is determined as the temperature of the optical fiber cable 10.

It is allowed that the temperature dependencies of spectral line width are different from each other, concerning the Brillouin spectra obtained from a plurality of optical fibers 12A, 12B included in the optical fiber cable 10.

Further, temperature analysis of the object to be measured 5 may be also performed by using both the peak frequency or frequency shift and the spectral line width of the Brillouin spectrum as parameters defining the Brillouin spectrum obtained from the optical fiber cable 10. In this case, the average temperature of the temperature of the optical fiber cable 10 determined on the basis of the frequency shift of the Brillouin spectrum as described above in the first embodiment and the temperature of the optical fiber cable 10 determined on the basis of the spectral line width as described hereinabove in the modification example is finally determined as the temperature of the optical fiber cable 10. The temperature analysis of the object to be measured 5 can thus be conducted with higher accuracy by performing the temperature analysis by using the information relating to peak frequency or frequency shift and spectral line width of the Brillouin spectrum obtained from a plurality of optical fibers.

SECOND EMBODIMENT OF SENSOR

Figure 8:
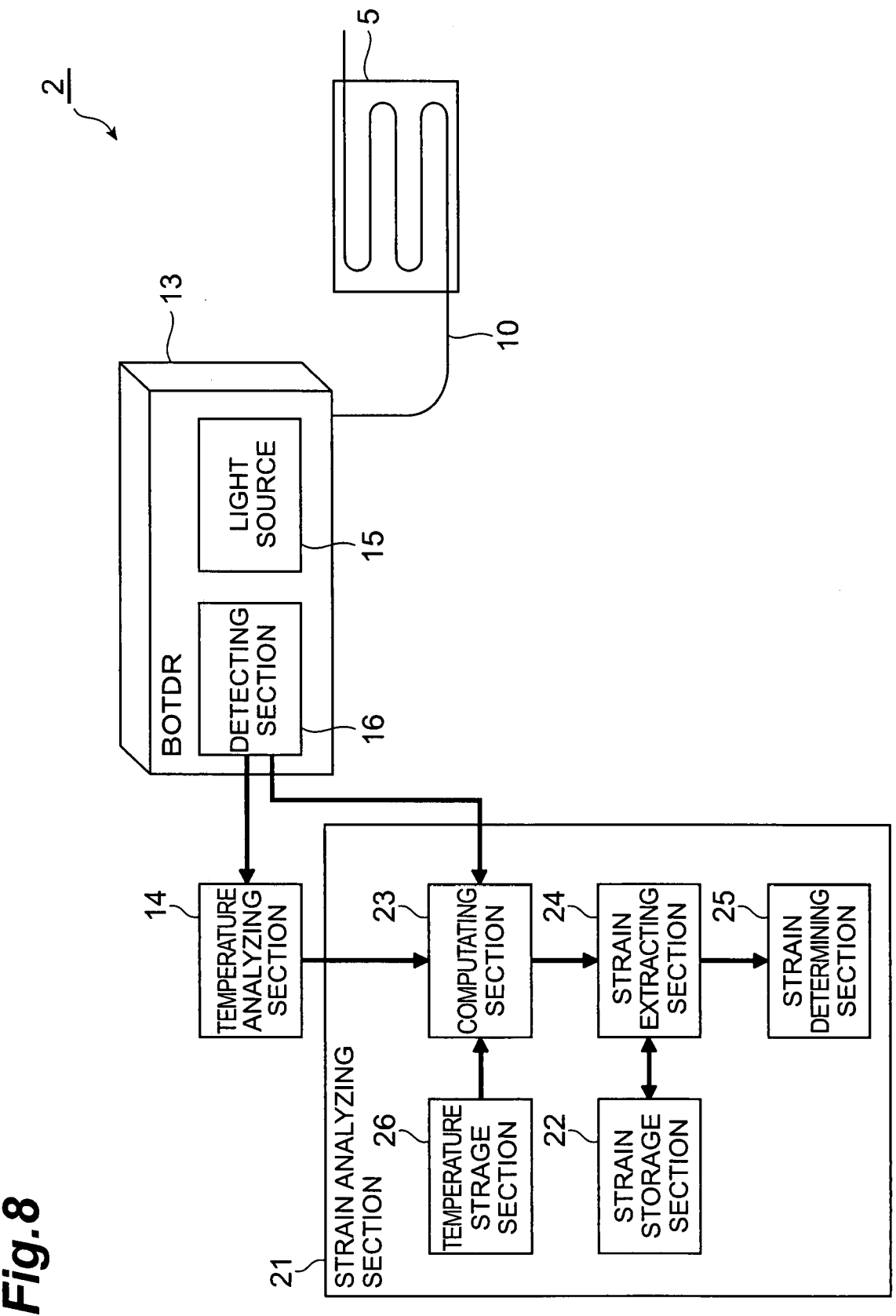
FIG. 8 shows the configuration of the second embodiment of the sensor according to the present invention.

The sensor 1 according to the above-described first embodiment and modification example and the disturbance measurement method using the sensor are used for measuring only the temperature of the object to be measured 5, whereas in the sensor according to the second embodiment and the disturbance measurement method using such as a sensor, the temperature and strain are measured by using the temperature dependency of spectral width line and strain dependency of frequency shift that serve as parameters defining the Brillouin spectrum. As shown in FIG. 8, the sensor 2 according to the second embodiment comprises an optical fiber cable 10 that is a disturbance detection probe, a BOTDR device 13, a temperature analyzing section 14, and also a strain analyzing section 21.

As described above, a plurality of optical fibers 12A, 12B included in the optical fiber cable 10 have Brillouin spectra that differ from one another in the temperature dependency of frequency shift of the Brillouin spectrum. In the second embodiment, similarly to the first embodiment, the optical fiber cable 10 is disposed in a tortuous manner on the surface of an object to be measured 5. When the object to be measured 5 is deformed, strain is generated in the optical fibers 10 that is in contact with the deformed portion and the optical fibers 12A, 12B are also deformed.

Similarly to the above-described first embodiment, the BOTDR device 13 comprises a light source 15 and a detecting section 16. The light source 15 outputs pump light, and the pump light is introduced into optical fibers 12A, 12B included in the optical fiber cable 10. In response to the introduced pump light, the optical fibers 12A, 12B output Brillouin scattering light. The detecting section 16 detects the Brillouin spectrum outputted from the optical fiber 12A and optical fiber 12B.

The detecting section 16 outputs the detection results of the detected Brillouin spectrum to the temperature analyzing section 14 and strain analyzing section 21. The detection results include the first and second frequency shift detection results and the first and second line width detection results. The first and second shift detection results mean the frequency shifts of the Brillouin spectra obtained from the optical fibers 12A, 12B, respectively. On the other hand, the first and second line width detection results mean spectral line widths of the Brillouin spectra obtained from the optical fibers 12A, 12B, respectively. The first and second line width detection results are outputted to the temperature analyzing section 14, and the first and second frequency shift detection results are outputted to the strain analyzing section 21.

The temperature analyzing section 14 determines the temperature of the optical fiber cable 10 on the basis of the first and second line width detection results outputted from the detecting section 16, in the same manner as in the modification example according to the first embodiment described above. Because the spectral line width does not depend on the amount of strain in the optical fiber cable 10, the temperature can be determined without being affected by the strain in the optical fiber cable 10. Then, the temperature analyzing section 14 outputs the temperature analysis results to the strain analyzing section 21.

The strain analyzing section 21 comprises a strain storage section 22, a computing section 23, a strain extracting section 24, a strain determining section 25, and a temperature storage section 26 and analyzes strain in the object to be measured 5 on the basis of the first and second shift detection results and temperature analysis results.

Thus, the strain storage section 22 stores the first shift information and second shift information in mutual association with the strain information indicating the amount of strain generated in the optical fiber cable 10. The first shift information and second shift information mean the frequency shifts of Brillouin spectra obtained from the optical fibers 12A, 12B in a state where the optical fiber cable 10 was strained by this amount of strain.

The temperature storage section 26 stores the first shift information and second shift information in mutual association with the temperature information.

The computing section 23 deducts the temperature contribution fraction on the basis of the temperature analysis results from the first shift detection results and second shift detection results outputted from the detecting section 16, thereby generating the first strain contribution information and second strain contribution information. The first and second shift detection results includes the temperature contribution fraction and strain contribution fraction of the optical fiber cable 12A, 12B. The first, strain contribution information means the frequency shift of the strain contribution fraction that was shifted due to the strain in the optical fiber 12A, from amongst the frequency shift of the Brillouin spectrum indicated by the first shift detection result. The second strain contribution information means the frequency shift of the strain contribution fraction that was shifted due to the strain in the optical fiber 12B, from amongst the frequency shift of the Brillouin spectrum indicated by the second shift detection result.

First, the computing section 23 extracts from the temperature storage section 26 the first and second shift information associated with the temperature information corresponding to the temperature analysis results outputted from the temperature analyzing section 14. The computing section 23 uses the extracted first and second shift information and deducts the temperature contribution fraction on the basis of the temperature analysis results from the first and second shift detection results outputted from the detecting section 16, thereby generating the first strain contribution information and second strain contribution information. The computing section 23 then outputs the generated first and second strain contribution information to the strain extracting section 24.

The strain extracting section 24 extracts the strain information stored in association with the first shift information corresponding to the frequency shift of the Brillouin spectrum indicated by the first strain contribution information from the strain storage section 22 as the first strain information. Likewise, the strain extracting section 24 extracts the strain information stored in association with the second shift information corresponding to the frequency shift of the Brillouin spectrum indicated by the second strain contribution information from the strain storage section 22 as the second strain information.

The strain determining section 25 determines the amount of strain in the optical fiber cable 10 based on the first and second strain information. More specifically, the strain determining section 25 takes the average value of the amount of strain indicated by the first strain information and the amount of strain indicated by the second strain information as the amount of strain in the optical fiber cable 10. The strain determining section 25 analyzes the amount of strain in the object to be measured 5 on the basis of the determined amount of strain in the optical fiber cable 10.

Figure 9:
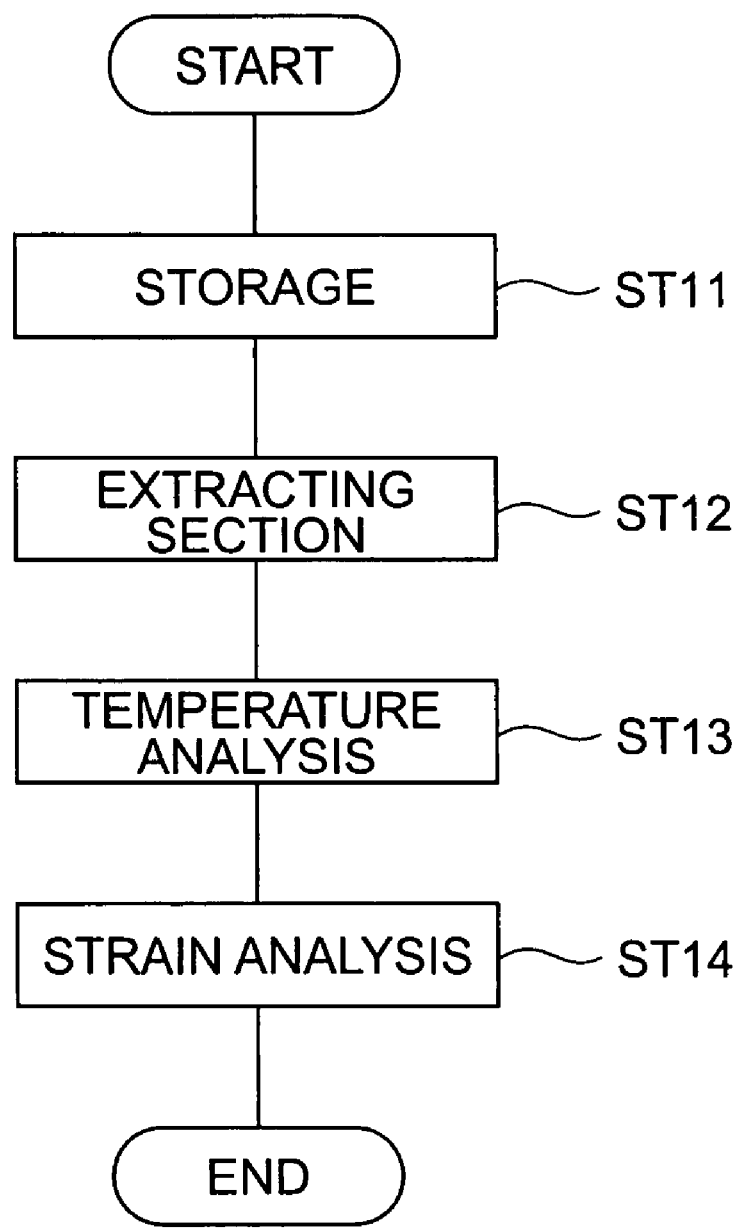
FIG. 9 is a flowchart showing the temperature measurement method (disturbance measurement method according to the present invention) using the sensor according to the second embodiment.

The method for measuring a temperature and strain (second embodiment of the disturbance measurement method according to the present invention) will be explained below as the operation of the sensor 2 according to the second embodiment with reference to the flowchart shown in FIG. 9. FIG. 9 is a flowchart for explaining the method for measuring temperature by using the sensor 2 according to the second embodiment. In the disturbance measurement method according to the second embodiment, the temperature and strain of the object to be measured 5 are measured by using the sensor 2.

The disturbance measurement method according to the second embodiment comprises a storage step ST11, a detection step ST12, a temperature analysis step ST13, and a strain analysis step ST14. In the storage step ST11, the temperature information related to the optical fiber cable 10, first line width information and second line width information are stored by the storage section 17. The strain information, first shift information, and second shift information of the optical fiber cable 10 are stored by the strain storage section 22.

In the detection step ST12 that follows the storage step ST11, the pump light is inputted into a plurality of optical fiber cable 12A, 12B. The Brillouin spectra obtained from the optical fiber cable 12A, 12B in response to the input of the pump light are detected by the detecting section 16. The first and second line width detection results that indicate the spectral line widths of the detected Brillouin spectra are outputted by the detecting section 16 to the temperature analyzing section 14. On the other hand, the first and second shift detection results that indicate the frequency shift are outputted by the detecting section 16 of the strain analyzing section 21.

Then, in the temperature analysis step ST13, the temperature information stored by the storage section 17 in a state of being associated with the first and second line width information indicated by the first and second line width detection results outputted from the detecting section 16 is extracted by the extracting section 18. The temperature of the optical fiber cable 10 is determined by the determining section 19 on the basis of the extracted temperature information. The temperature analysis results are outputted to the strain analyzing section 21.

In the strain analysis step ST14 that follows the temperature analysis step ST13, the computing section 23 generates the first and second strain contribution information by deducting the temperature contribution fraction, based on the temperature analysis results from the inputted first and second shift detection results. The first and second strain information corresponding to the first and second strain contribution information is extracted from the strain storage section 22 by the strain extracting section 24. Where the first and second strain information is extracted, the average value of the amounts of strain indicated by the first strain information and second strain information is determined as the amount of strain of the optical fiber cable 10 by the strain determining section 25. The strain of the object to be measured 5 is then analyzed in the determining section 25, based on the determined amount of strain.

By carrying out the above-described disturbance measurements, the temperature analysis can be conducted with better accuracy than that attained by using a plurality of spectral line widths that do not depend on the amount of strain. Furthermore because strain measurements of the optical fiber cable 10 are carried out on the basis of the analyzed temperature and on the frequency shift or peak frequency of the Brillouin spectrum obtained from the waveguides (core regions of the optical fibers 12A, 12B) that have mutually different extremal temperatures in the Brillouin spectrum frequency shift with respect to temperature, the strain analysis of the object to be measured can be conducted with higher accuracy. Thus, by using both the spectral line width and peak frequency of frequency shift of the Brillouin spectrum, both the temperature and strain generated in the core regions of the optical fibers 12A, 12B included in the optical fiber cable 10 can be determined with good accuracy. Therefore, in the disturbance measurement method according to the second embodiment, both the strain and the temperature of the object to be measured 5 can be analyzed with higher accuracy.

The present invention is not limited to the above-described first embodiment and second embodiment and can be modified in a variety of ways. For example, the configuration of the optical fiber cable 10 employed as a disturbance detection probe can be modified in a variety of ways, as shown in FIGS. 10 and 11. FIGS. 10 and 11 are cross-sectional views showing various structures of the optical fiber cable employed in the sensor section of the sensor of the present invention. Thus, an optical fiber cable 10A shown in the area (a) of FIG. 10 comprises two optical fibers 12A, 12B, a cable jacket 31, and two strength wires (strength member) 32. The two optical fibers 12A, 12B are positioned in the central section of the cable jacket 31, and the strength wires 32 are positioned on both sides of the optical fibers 12A, 12B. The cable jacket 31 covers the two optical fibers 12A, 12B and two strength wires 32 and is formed to have a sheet-like shape.

In the optical fiber cable 10B shown in the area (b) of FIG. 10, a strength wire 33 is disposed between two optical fibers 12A, 12B, and a buffer material 34 formed to have a round cross section is disposed so as to fill the space between the two optical fibers 12A, 12B and strength wire 33 and cover them. A binding tape 35 is wound around the buffer material 34, and a cable jacket 36 is disposed on the outer periphery of the binding tape 35.

In the optical fiber cable 10C shown in the area (c) of FIG. 10, strength member yarns 37 are disposed around the optical fiber 12A, and strength member yarns 38 are disposed around the optical fiber 12B. A cable jacket 39 is formed so as to cover both the strength member yarn 37 and the strength member yarn 38.

A optical fiber cable 10D shown in the area (a) in FIG. 11 is a loose-type cable, in which the optical fiber 12A and optical fiber 12B are inserted into the tube 41. A coating 42 that covers both the optical fiber 12A and the optical fiber 12B is formed to have a round cross section, and a space around the coating 42 is filled with air or jelly 43. Further, a braiding 44 is disposed between the inner wall surface of the tube 41 and the jelly 43. Such an optical fiber cable 10D of a loose tube type is hardly affected by strain. Further, the optical fiber cable 10D may have no coating 42, as in an optical fiber cable 10E shown in the area (b) of FIG. 11.

The above-described optical fibers 12A, 12B are configured of a core region 121 and a cladding region 122, as shown in the area (b) of FIG. 3, but they may also be coated fibers that are coated with a UV-curable resin or plastic resin. Further, the number of optical fibers included in the optical fiber cables 10, 10A to 10E may be three or more.

The optical fiber cable 10 may be disposed as shown in FIG. 12 according to the shape of the object to be measured 5. FIG. 12 shows the arrangement example of a sensor section (optical fiber cable) of the sensor according to the present invention. The optical fiber cable 10 may be disposed along one direction of an object to be measured 5A, as shown in the area (a) of FIG. 12. Alternatively, the optical fiber cable 10 may be disposed as a two-line configuration along one direction of an object to be measured 5B, as shown in the area (b) in FIG. 12. Further, the optical fiber cable 10 may be spirally wound about the side source of an object to be measured 5C, as shown in the area (c) of FIG. 12. When the object to be measured is a hollow physical body, the optical fiber cable 10 may be disposed along the inner side surface of the object to be measured. The optical fiber may be also embedded in the material constituting the object to be measured.

In the above-described first and second embodiments, the Brillouin spectrum was detected by a BOTDR method using the BOTDR device 13, but the detection of the Brillouin spectrum may be also performed by the BOTDA (Brillouin Optical Time Domain Analysis) method using a BOTDA device. In addition, the detection of the Brillouin spectrum may be performed by the BOCDA (Brillouin Optical Correlation Domain Analysis) method using a BOCDA device. When a Brillouin spectrum is detected by using these method, the temperature distribution and strain distribution along the longitudinal direction of the optical fibers 12A, 12B can be measured.

Figure 13:
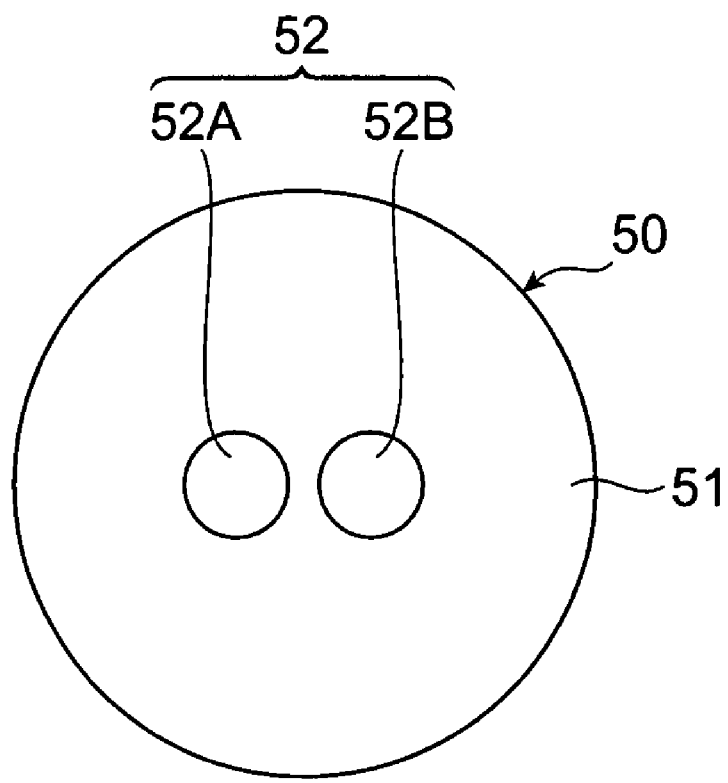
FIG. 13 is a cross-sectional view showing the structure of the optical fiber cable for use in the sensor section of the sensor according to the present invention (Part 3)

Further, an optical fiber cable 50 shown in FIG. 13 may be used instead of the optical fiber cable 10 for the disturbance detection probe. FIG. 13 is a cross-sectional view showing a structure of the optical fiber cable for use in the sensor section of the sensor according to the present invention. The optical fiber cable 50 is an optical fiber comprising a core region 52 and a cladding region 51 enveloping the core region 52; more specifically, it is constituted by a plurality of core regions 52A, 52B, each functioning as a waveguide, and a cladding region 51 that integrally envelopes the core regions 52A, 52B. A plurality of core regions 52A, 52B differ from one another in the temperature dependency of Brillouin spectrum frequency. A plurality of core regions 52A, 52B differ from one another in the temperature dependency of Brillouin spectrum shape.

Further, a plurality of core regions 52A, 52B are configured so that no light power coupling occurs therebetween. For example, in the optical fiber cable 50, as shown in FIG. 13, two core regions 52A, 52B are disposed without mutual contact in the central region of the cladding region 51.

By inputting respective pump light into the core regions 52A, 52B, the Brillouin scattering light is outputted from the core regions 52A, 52B. The Brillouin scattering light corresponds to the Brillouin scattering light outputted from the above described core regions 52A, 52B. Therefore, the temperature analysis and strain analysis of the object to be measured 5 can be conducted by the disturbance measurement method using the above-described sensor 1, 2 and these core regions.

THIRD EMBODIMENT OF SENSOR

Figure 14:
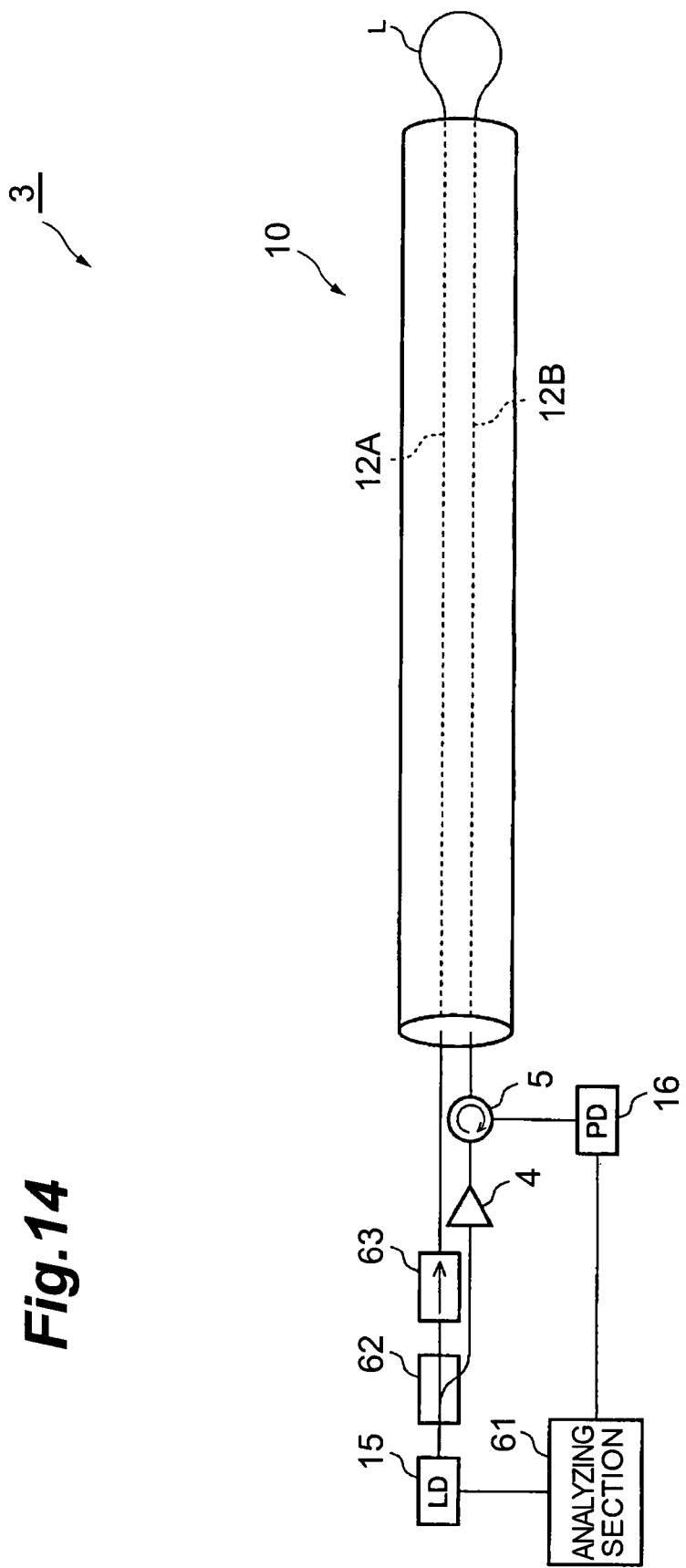
FIG. 14 shows the configuration of the third embodiment of the sensor according to the present invention.

As described above, not only the disturbance measurements based on the BOTDR method, but a variety of other measurement methods can be implemented in the sensor according to the present invention. A BOCDA-type sensor will be explained below as the third embodiment of the sensor according to the present invention. FIG. 14 shows a configuration of the third embodiment of the sensor according to the present invention. The sensor 3 according to the third embodiment shown in FIG. 14 comprises a LD 15 that is a light source, a coupler 62 that divides the light signal equally into two parts, an isolator 63 through which the light can pass in one direction but cannot pass in the opposite direction, an amplifier 64 that amplifies the light signals, a circulator 65 having three ports and serving for coupling to one port that is adjacent to another port, a PD 16 (detecting section), which is a light-receiving element, an analyzing section 61 that analyzes a disturbance such as temperature and strain based on the electric signals of LD 15 and PD 16, and an optical fiber cable 10 (sensor section) that is employed as a disturbance detection probe. The optical fiber cable 10 comprises at least two optical fibers 12A, 12B (core regions of these optical fibers 12A, 12B correspond to waveguides) as waveguides having mutually different Brillouin scattering characteristics.

The sensor section of the sensor 3 according to the third embodiment will be explained by considering the optical fiber cable 10 comprising two optical fibers 12A, 12B as a representative example, but an optical fiber cable comprising three or more optical fibers may be also employed. Furthermore, an optical fiber for signal transmission, other than that for the sensor, may be also included into the optical fiber cable 10. Furthermore, each of the optical fibers 12A, 12B included in the optical fiber cable 10 may be a single-mode optical fiber or a multimode optical fiber. Further, when both optical fibers 12A, 12B are multimode optical fibers, the gain (maximum gain of the spectral peak) at the peak frequency tends to decrease, and single-mode optical fibers are preferred as the optical fibers 12A, 12B. Further, optical fibers other than silica-based fibers, for example plastic optical fibers, can be also used, provided that they have different Brillouin scattering characteristics.

The sensor 3 according to the third embodiment has a loop structure (L section in FIG. 14) in which the ends of the two optical fibers 12A, 12B are connected to each other at one end of the optical fiber cable 10. Further, at the other end section of the optical fiber cable 10, a probe light is inputted from the other end (side of the LD 15) of one optical fiber 12A, and a pump light is inputted from the other end (side of LD 15) of the other optical fiber 12B. In the analyzing section 61, the electric signals of LD 15 and PD 16 are computed and the strain and temperature generated in the optical fiber cable 10 are analyzed. For the sake of convenience of explanation, the ends of the optical fibers 12A, 12B, at the side of the LD 15 will be referred to as "initial ends" and the ends at the side of the L section will be referred to as "final ends".

By taking the final ends of the optical fibers 12A, 12B as loop wirings, the final end side can be freely disposed in any location. Therefore, the installation operation is facilitated by comparison with that of the conventional optical fiber cable, and a wider measurement range can be covered with the optical fiber cable of the same length as the conventional optical fiber cable. In addition, because the sensor 3 according to the third embodiment employs a BOCDA system, strain/temperature analysis excelling in distance resolution can be preformed.

Figure 15:
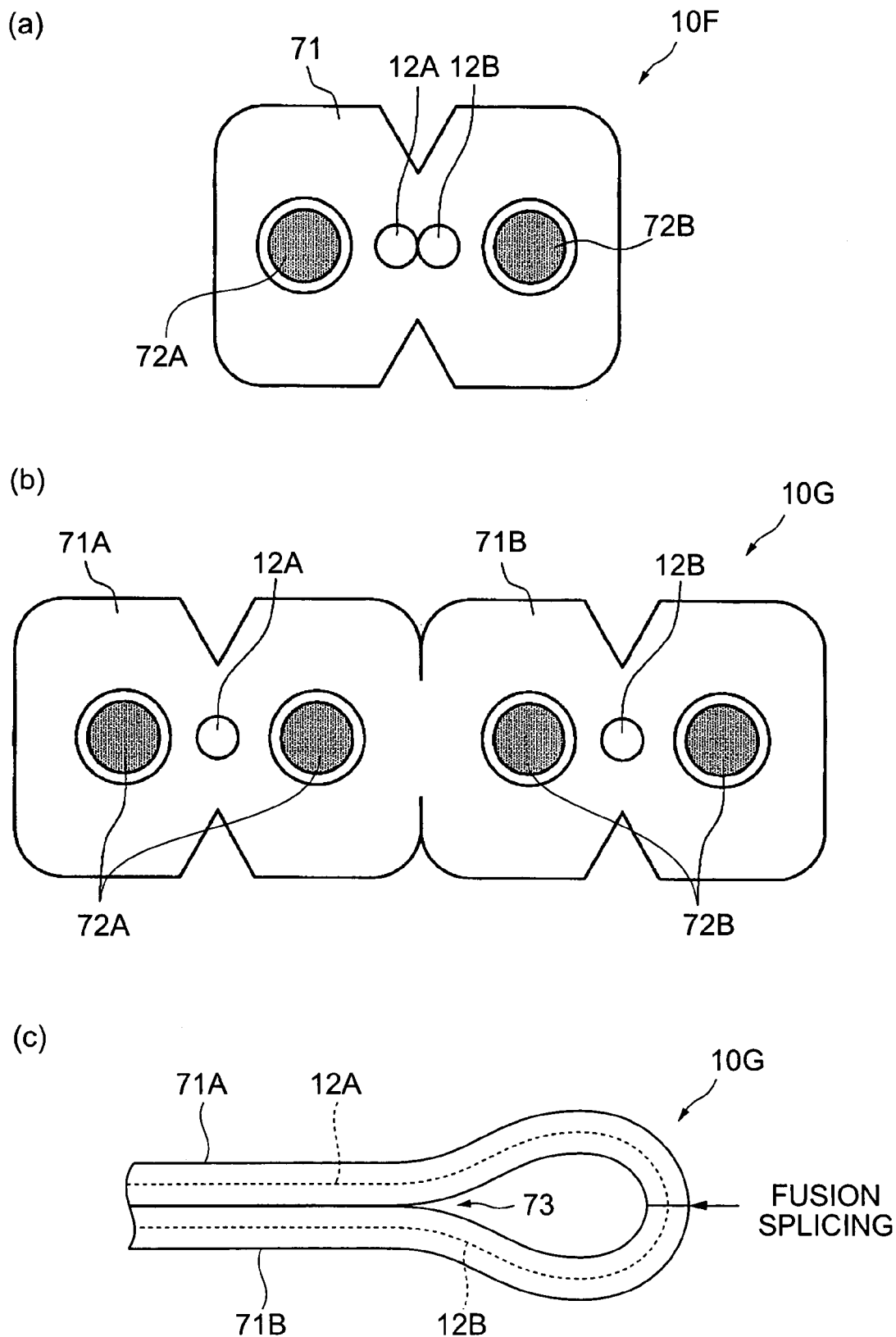
FIG. 15 is a cross-sectional view showing various structures of optical fiber cables for use in the sensor section of the sensor according to the present invention (Part 4)

FIG. 15 is a cross-sectional view showing various structures of the optical fiber cable 10 for use in the sensor section of sensor 3 according to the third embodiment. In particular, optical fibers 10F, 10G shown in FIG. 15 use optical fibers with different strain coefficient/temperature coefficient of frequency shift of the Brillouin spectrum.

The optical fiber cable 10F shown in the area (a) of FIG. 15 comprises two optical fibers 12A, 12B, two strength wires 72A, 72B disposed so as to sandwich the optical fibers 12A, 12B, and a cable jacket 71 integrally covering the optical fibers 12A, 12B and strength wires 72A, 72B. The optical fiber cable 10F has a structure similar to that of the optical fiber cable 10A shown in the area (a) of FIG. 10, but the two optical fibers 12A, 12B are disposed closer to each other.

The optical fiber cable 10G shown in the area (b) of FIG. 15 comprises a left optical fiber cable that is constituted by an optical fiber 12A, two strength wires 72A disposed so as to sandwich the optical fiber 12A, and a cable jacket 71A that covers integrally the optical fiber 12A and strength wires 72A, and a right optical fiber cable that is constituted by an optical fiber 12B, two strength wires 72B disposed so as to sandwich the optical fiber 12B, and a cable jacket 71B that covers integrally the optical fiber 12B and strength wires 72B. In the optical fiber cable 10G, the right optical fiber cable and left optical fiber cable are integrally formed so that they can be separated in the left-right direction from the up-down-cut line 73.

In the optical fiber cable 10G shown in the area (b) of FIG. 15, one optical fiber cable is formed so that it can be separated into two optical fiber cables, but two optical fiber cables that were formed separately may be combined into one optical fiber cable by bonding with an adhesive or the like. Further, two optical fiber cables that were formed separately may be disposed in a separated state. Thus, in any state of the optical fiber cables, the final ends of the optical fibers can be interconnected in a loop-like fashion.

In the areas (a) and (b) shown in FIG. 15, the optical fibers 12A, 12B are dissimilar optical fibers in which at least one of the strain coefficient and temperature coefficient of the frequency shift of the Brillouin spectrum differs between the fibers. The optical fiber cables 10F, 10G comprising such dissimilar optical fibers 12A, 12B are so designed that almost identical strains are generated in the optical fibers 12A, 12B when an external force acts upon them. The optical fibers 12A, 12B are affected by both the strain and the temperature, but, for example, the optical fibers that differ in the temperature dependency of frequency shift of the Brillouin spectrum may be disposed inside a single optical fiber cable. Because the effects of strains and temperature in this case can be separated, the analyzing section 61 can easily determine the respective values thereof.

In the case of a structure that enables the separation into two optical fibers in which optical fibers are respectively covered with cable jackets 71A, 71B, e.g., from a plastic resin, as shown in the area (b) of FIG. 15, when the optical fibers 12A, 12B are connected to each other at the end section of the optical fiber cable 10G, because the optical fibers 12A, 12B are protected by the strength wires 72A, 72B and cable jackets 71A, 71B, the operation of directly handling small-diameter optical fibers is reduced in volume and the operation as a whole are facilitated. Thus, as shown in the area (c) of FIG. 15, a loop structure can be easily realized in one end section of the optical fiber cable 10G. Further, because the optical fiber cable 10G can be easily cleaved in the left-right direction at the notch 73, the connection can be easily performed by using a connector of a type that directly clamps the cable jacket.

An example of the strain/temperature measurement method using the optical fiber cable (sensor section) employed as the disturbance detection probe will be explained below. The frequency shift $v_B$ of the Brillouin spectrum of an optical fiber is represented by the following Formula (2) as a function of strain $\epsilon$ and temperature T generated in the optical fiber:

[Formula 2]

$$v_B = v_{B0} + \text{strain coefficient } \iota \times \epsilon + \text{temperature coefficient } \kappa \times T \quad (2)$$

Here, the strain coefficient $\iota$ and temperature coefficient $\kappa$ are coefficients inherent to the optical fiber, the strain coefficient $\iota$ has a value of about 0.05 to 0.06 MHz/με and the temperature coefficient $\kappa$ has a value of about 1.5 to 2.2 MHz/° C.

As described above, strains of the order of about 1000 to 3000 με are measured in most cases and the frequency shift of the Brillouin spectrum varies within a range of about 50 to 180 MHz under the effect of strain, the specific values being different depending on the deformation state of the object to be measured and required measurement accuracy. On the other hand, the temperature range of about 20 to 50° C. is most often measured and the frequency shift of the Brillouin spectrum varies within a range of about 30 to 110 MHz under the effect of temperature, the specific values being different depending on the environment in which the object to be measured is used.

In the sensor 3 according to the third embodiment, dissimilar optical fibers 12A, 12B having different temperature coefficients are provided inside the optical fiber cable 10, and the frequency shift VB of the Brillouin spectrum of the optical fibers 12A, 12B in a certain position is measured by connecting the end sections of these optical fibers 12A, 12B together. With such a configuration the strain $\epsilon$ and temperature T that are wished to be measured can be determined from the following system of equations (formula (3), formula (4)).

[Formula 3]

$$v_{B1} = v_{B10} + \text{strain coefficient } \iota_1 \times \epsilon + \text{temperature coefficient } \kappa_1 \times T \quad (3)$$

[Formula 4]

$$v_{B2} = v_{B20} + \text{strain coefficient } \iota_2 \times \epsilon + \text{temperature coefficient } \kappa_2 \times T \quad (4)$$

Here, $v_{B1}$, $v_{B2}$ are the frequency shifts of the Brillouin spectra that were actually measured in the optical fibers 12A, 12B, respectively, and the strain coefficient $\iota_1$, temperature coefficient $\kappa_1$, strain coefficient $\iota_2$, and temperature coefficient $\kappa_2$ are intrinsic coefficients of the optical fibers 12A, 12B.

Figure 16:
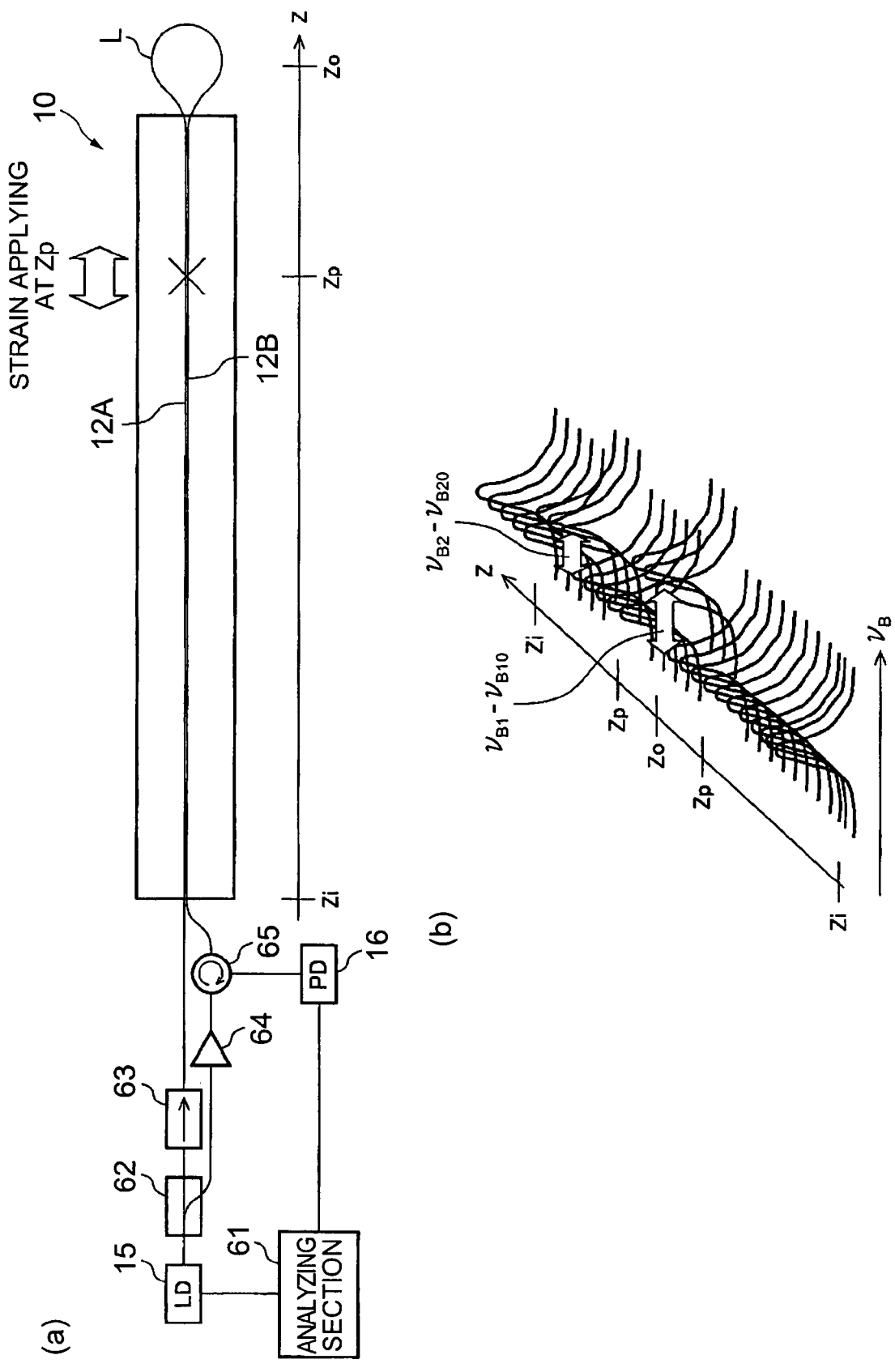
FIG. 16 shows a state in which a strain is applied to a $Z_p$ point of the optical fiber cable in the sensor section in the sensor (FIG. 14) according to the third embodiment.

FIG. 16 shows a state in which a strain is applied to a $Z_p$ point of the optical fiber cable 10 that is a sensor section in the sensor 3 (FIG. 14) of the third embodiment. As shown in the area (a) of FIG. 16, the Z axis represents a position on the optical fiber cable 10, the initial end and final end of the optical fiber cable 10 are denoted by $Z_i$ and $Z_o$, respectively, and the relationship between the position Z and frequency shift $v_B$ of the Brillouin spectrum is shown in the area (b) in FIG. 16. As shown in the area (b) in FIG. 16, in the $Z_p$ point where the strain is applied, the frequency shift $v_B$ of the Brillouin spectrum varies by $(v_{B1}-v_{B10})$ in the optical fiber 12A and by $(v_{B2}-v_{B20})$ in the optical fiber 12B. The shift values $(v_{B1}-v_{B10})$ and $(v_{B2}-v_{B20})$ differ from one another, and the strain $\epsilon$ and temperature T can be calculated by substituting them into the formula (3) and formula (4).

Thus, with the sensor 3 of the third embodiment, because the optical fiber cable 10 comprising at least two optical fibers that differ in the response of peak frequency or frequency shift of the Brillouin spectrum to the occurring variation in strains and temperature is employed as a sensor section, the strain and temperature of the object to be measured can be individually analyzed with high accuracy based on the variations of peak frequency or frequency shift of the Brillouin spectrum in these optical fibers. When the strain coefficients $\iota_1$, $\iota_2$ and temperature coefficients $\kappa_1$, $\kappa_2$ differ significantly, as in the combination of fiber A and fiber C shown in the table of FIG. 2 and representing an example of optical fibers that are actually used, the frequency shifts $(v_{B1}-v_{B10})$ and $(v_{B2}-v_{B20})$ of Brillouin spectrum also differ significantly. Therefore, the strains and temperature can be measured with better accuracy.

Further, because the end sections of the two optical fibers are connected in a loop fashion in the end section of the optical fiber cable 10, the final end of the optical fiber cable that is obtained by causing the entire optical fiber cable that has to be installed to be deformed into a loop-like shape is not required to be installed in the same place as the initial end, and the operation of installing the optical fiber cable is facilitated. Furthermore, the installation range can be expanded and strain-temperature analysis can be conducted with better distance resolution than in the case of the conventional optical fiber cable of the same length.

Further, the sensor section of the third embodiment may be an optical fiber cable comprising dissimilar optical fibers that differ in temperature dependency of the frequency shift of Brillouin spectrum, and inexpensive optical fibers of general use, such as indoor cables, can be used.

The above-described optical fiber cable has a structure employing optical fibers with different strain coefficients and temperature coefficients depending on the peak frequency of the Brillouin spectrum. However, the effects of strain and temperature can be separated from each other even when an optical fiber cable having a structure in which strain and temperature variations occurring in the optical fiber due to external forces from the object to be measured differ between the optical fibers is used as the optical fiber cable for the sensor section.

Figure 17:
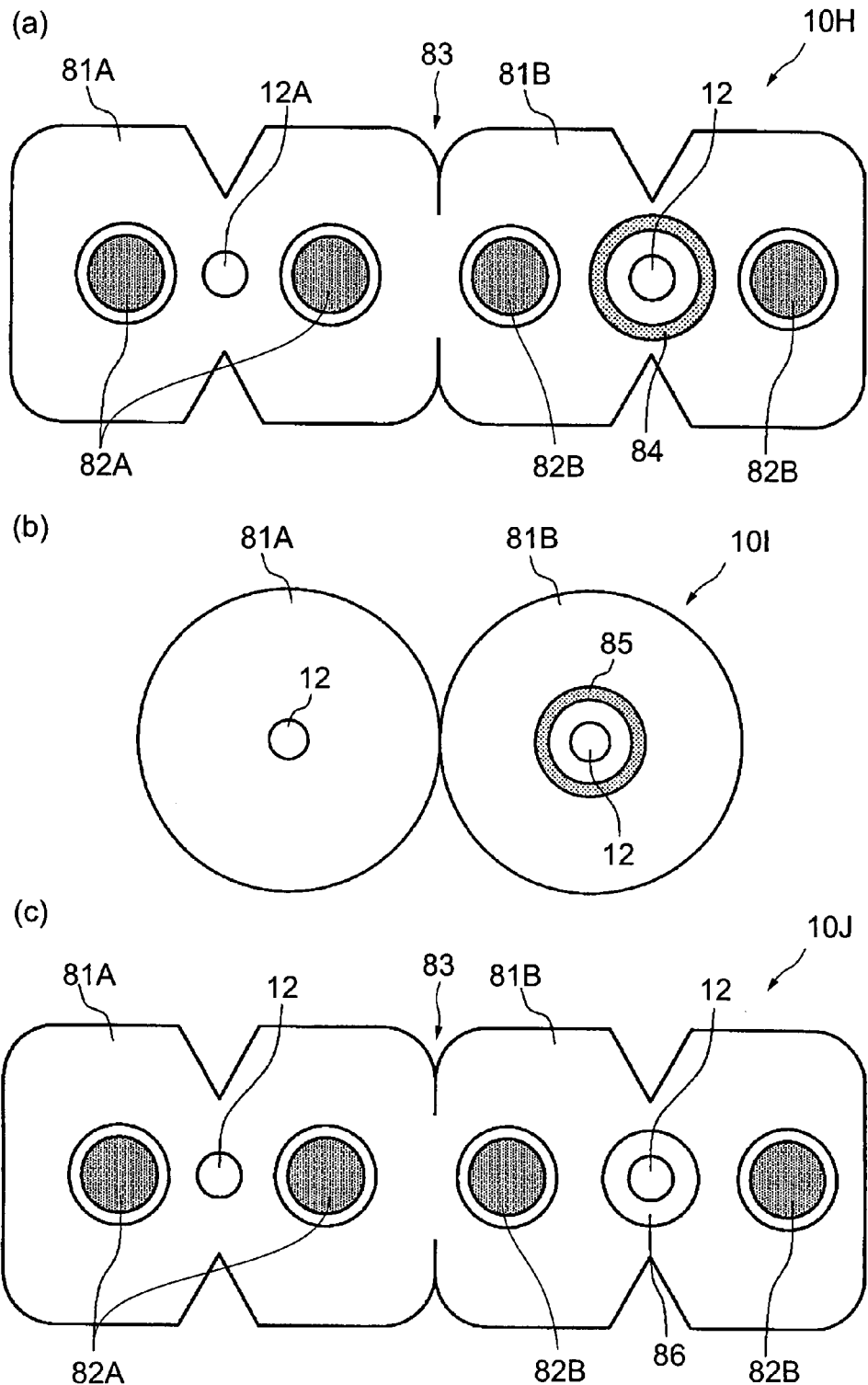
FIG. 17 is a cross-sectional view showing various structures of optical fiber cables for use in the sensor section of the sensor according to the present invention (Part 5), more particularly a cross-sectional view showing various structures with different propagation modes of disturbance from the object to be measured to the sensor section.

FIG. 17 is a cross-sectional view showing various structures of optical fiber cables that can be used in the sensor sections of sensors 1 to 3 according to the present invention, more particularly cross-sectional views showing various structures with different propagation mode of external force and heat from the object to be measured to the sensor section.

The optical fiber cable 10H, shown in the area (a) of FIG. 17, comprises a left optical fiber cable that is constituted by one optical fiber 12, two strength wires 82A disposed so as to sandwich this one optical fiber 12, and a cable jacket 81A that integrally covers these one optical fiber 12 and strength wires 82A, and a right optical fiber cable that is constituted by another optical fiber 12 (the optical fiber of the same type), two strength wires 82B disposed so as to sandwich this another optical fiber 12, and a cable jacket 81B that integrally covers these another optical fiber 12 and strength wires 82B, and then these left optical fiber cable and right optical fiber cable are formed integrally. The two optical fiber cables can be separated into a left and right optical fiber cables with respect to a vertical notch 83. In such optical fiber cable 10H, two optical fibers 12 of the same type are used, the optical fiber 12 located on one side (right side in the figure) is disposed in a loose state inside the resin tube 84 such as a plastic tube.

The optical fiber cable 10I shown in the area (b) of FIG. 17 comprises a left optical fiber cable configured of one optical fiber 12 and a cable jacket 81A that covers the one optical fiber 12 and a right optical fiber cable configured of another optical fiber 12 (optical fiber of the same type) and a cable jacket 81B that covers the other optical fiber 12. In the optical fiber cable 10I, two optical fibers 12 of the same type are used and the other optical fiber 12 (right side in the figure) is disposed inside a metal tube 85.

Further, the optical fiber cable 10J shown in the area (c) of FIG. 17 has a configuration similar to that of the optical fiber cable 10H shown in the area (a) of FIG. 17, in which the other optical fiber 12 (right side in the figure) is covered with a buffer filling 86 such as a strength member yarns. For example, plastic fibers or the like can be used for the buffer filling 86. The left optical fiber cable is configured of one optical fiber 12, two strength wires 82A disposed so as to sandwich the one optical fiber 12, and a cable jacket 81A that integrally covers the one optical fiber 12 and strength wires 82A. Further, the right optical fiber cable is configured of another optical fiber 12, two strength wires 82B disposed so as to sandwich the other optical fiber 12, and a cable jacket 81B that integrally covers the other optical fiber 12 and strength wires 82B. The optical fiber cable 10J is obtained by forming the left optical fiber cable and right optical fiber cable integrally in a state where a notch 83 is formed.

In the optical fiber cables 10H to 10J shown in the areas (a) to (c) of FIG. 17, one optical fiber is accommodated inside the cable in a tight state in which the optical fiber is almost integrated with the cable jacket (left side in the figure), whereas the other optical fiber can move in the longitudinal direction or radial direction of the cable and is accommodated inside the cable in a state where it has an extra length inside the cable (right side in the figure). As a result, for example, where a tension is applied to the installed optical fiber cable and strain is generated, the frequency shift of the Brillouin spectrum will vary under the effect of strain in the optical fiber that is accommodated in the cable a tight state in which it is almost integrated with the optical fiber cable, but in the other optical fiber which has an extra length with respect to the optical fiber cable, the strain allowed by the extra length will not be applied. Therefore, the tension (amount of strain occurring in the cable) that is applied to the cable from the object to be measured can be easily calculated from the different with the variation amount of frequency shifts of Brillouin spectra of the two optical fibers.

The above-described optical fiber cables 10H to 10J differ in the cable structure and material around the two optical fibers 12. Therefore, because the temperatures of the two optical fibers 12 differ, the cables are not suitable for use in environments with severe temperature fluctuations. However, such cables are sufficiently effective in environments where the temperature changes gradually and the two optical fibers are at almost the same temperature.

Further, even when a compressive strain occurs in the optical fiber cables 10H to 10J, the compressive strain occurs in one optical fiber 12 that is accommodated in the cable in a tight state in which the optical fiber is almost integrated with the cable, but no strain occurs in the other optical fiber 12, which can move in the longitudinal and radial directions of the cable. Therefore, a force in the compression direction (amount of strain occurring in the cable) that is applied from the object to be measured to the cable can be easily calculated from the difference in the variation amount of frequency shifts in the Brillouin spectra of the two optical fibers 12.

When the optical fiber cables 10H to 10J are stretched more than the extra length of the other optical fiber 12, strains also occur in the other optical fiber 12 that was provided in advance with the extra length. Therefore, the extra length of the other optical fiber 12 that has been loosely accommodated in the cable is desirably as large as possible. Accordingly, it is preferred that the extra length of the other optical fiber 12 be more than about 0.2% of the loose optical fiber cable of general applications. In order to ensure such extra fiber length, the other optical fiber 12 is preferably enclosed in a metal or resin tube and then accommodated in the cable.

Figure 18:
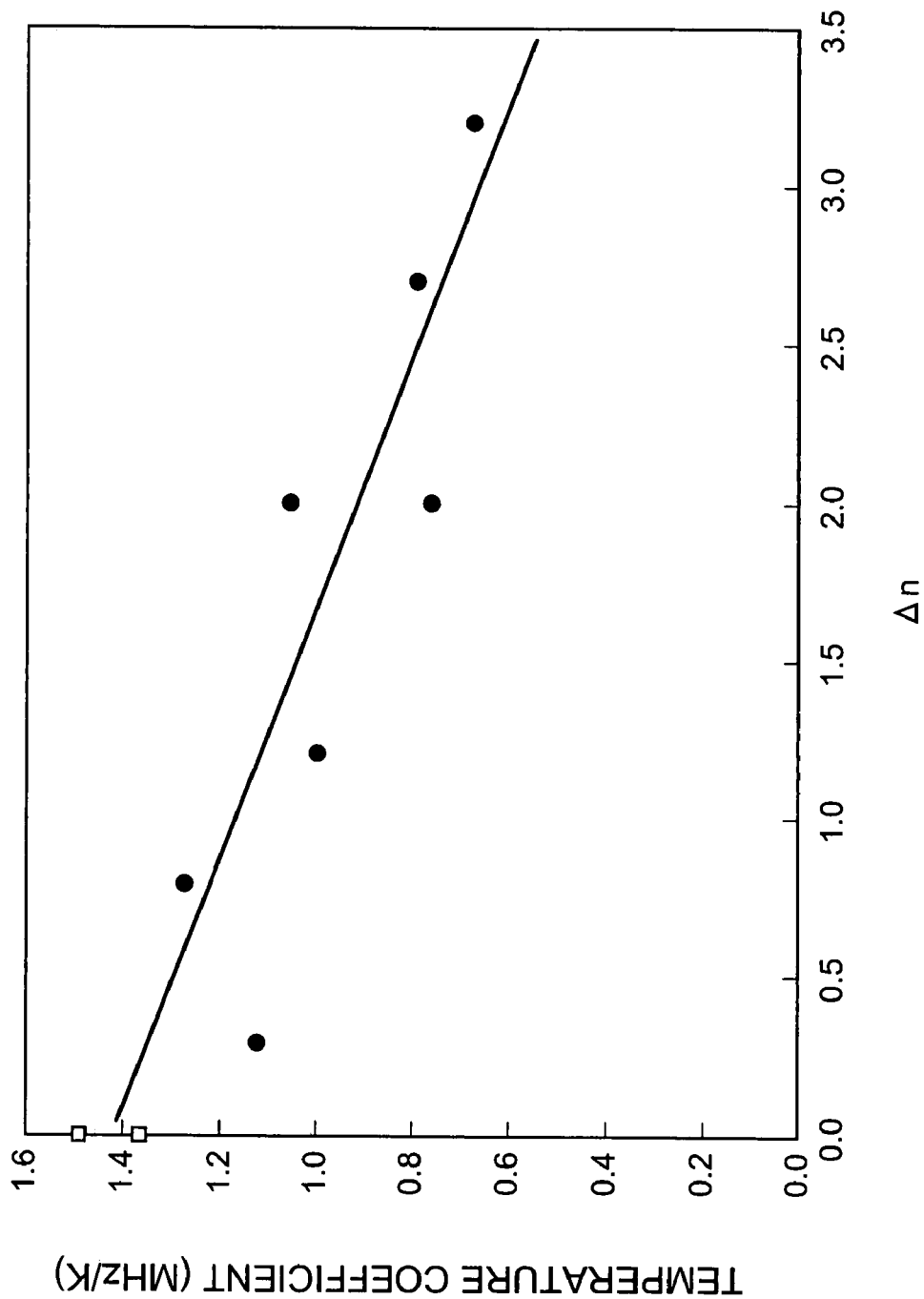
FIG. 18 is a graph showing the temperature coefficient dependency on the relative refractive index difference between the core region and cladding region in the optical fiber that is employed in the sensor section (optical fiber cable) of the sensor according to the present invention.

In order to realize a structure with higher resistance to the influence of disturbance in the loosely accommodated optical fiber from among the optical fibers accommodated in the optical fiber cables 10H to 10J, it is preferred that an optical fiber be used that has the weakest temperature dependency of the peak frequency of the Brillouin spectrum. FIG. 18 is a graph showing the temperature coefficient dependency of the relative refractive index difference between the core region and cladding region in the optical fiber employed in the sensor section (optical fiber cable) of the sensor according to the present invention. In FIG. 18, the relative refractive index difference between the core region and pure silica is plotted against the abscissa, and the temperature coefficient (MHz/K) of peak frequency of the Brillouin spectrum is plotted against the abscissa. The temperature coefficient $\Delta vB(=\Delta n+\frac{1}{2}\Delta E-\frac{1}{2}\Delta\rho)$ of the peak frequency of the Brillouin spectrum depends on variation of Young's modulus E and density $\rho$ with temperature. $\Delta n$ is about $10^{-5}$, $\Delta E$ is about $10^{-4}$, and $\Delta\rho$ is about $10^{-5}$. For example, by appropriately adjusting the doping concentration of Ge in the core region of an optical fiber, it is possible to prepare optical fibers that differ in the relative refractive index difference $\Delta n$ between the core region and pure silica, whereby a temperature dependency of the peak frequency of the Brillouin spectrum can be obtained for the entire optical fiber cable. Thus, it is preferred that the optical fiber with the lowest temperature coefficient (the optical fiber with the largest relative refractive index difference $\Delta n$ between the core region and pure silica) be accommodated loosely inside the cable.

Figure 19:
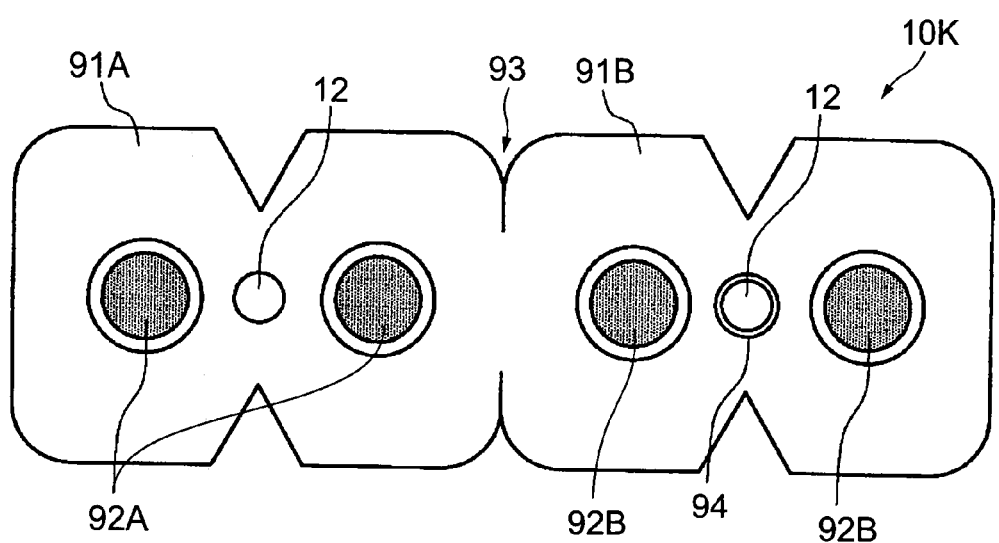
FIG. 19 is a cross-sectional view showing various structures of optical fiber cables for use in the sensor section of the sensor according to the present invention (Part 6), more particularly a cross-sectional view showing a structure in which one optical fiber of two optical fibers constituting the optical fiber cable that is a sensor section is coated with a thermally insulating member with a small heat conduction coefficient.

FIG. 19 is a cross-sectional view showing the structure of an optical fiber cable employed in the sensor section of the sensor according to the present invention. This cross-sectional view showing a structure in which one optical fiber of two optical fibers constituting the optical fiber cable that is the sensor section is covered with a thermally insulating member with a small heat conduction coefficient. More specifically, the optical fiber cable 10K shown in FIG. 19 comprises a left optical fiber cable configured of one optical fiber 12, two strength wires 92A disposed so as to sandwich the one optical fiber 12, and a cable jacket 91A that integrally covers these one optical fiber 12 and strength wires 92A, and a right optical fiber cable configured of another optical fiber 12, two strength wires 92B disposed so as to sandwich another optical fiber 12, and a cable jacket 91B that integrally covers these other optical fiber 12 and strength wires 92B. These left optical fiber cable and right optical fiber cable are integrated so that they can be separated in the left-right direction from the notch 93. Two optical fibers 12 of the same kind are arranged in the optical fiber cable 10K, and the other (right side in the figure) optical fiber 12 is covered with a thermally insulating member 94 with a small heat conduction coefficient.

As a result, when a tension force is applied to the installed optical fiber cable 10K, almost identical strains occur in the two optical fibers 12, but because a coating from a thermally insulating member 94 that has a significantly different heat conduction coefficient is provided on one (right side in the figure) of the two optical fibers 12, the two optical fibers 12 have different temperatures in the environment with severe temperature fluctuations and the separation of temperatures becomes possible. For example, a foamed plastic is preferred as the thermally insulating member 94.

In the optical fiber cable 10K shown in FIG. 19, both optical fibers 12 are accommodated in an almost integrated state, and the optical fiber cable structure is different from the loose structure of optical fiber cables 10H to 10J shown in FIG. 17.

As a means for creating a large difference in heat conduction coefficient between the optical fibers accommodated in the cable, for example, an alumina coating or a carbon coating may be provided on the optical fiber 12 (right side in the figure) that is coated with a thermally insulating member 94. The optical fiber cable 10K of such a configuration is effective in an installation environment with temperature fluctuations matching the heat induction coefficient around the optical fiber 12.

As described above, in accordance with the present invention, by employing a cable structure in which the disturbances transmitted from the object to be measured to the optical fiber cable differ between the optical fibers, it is possible measure a strain and temperature separately from one another. Further, by employing different cable structures, it is possible to employ optical fibers for general use of the same type and to employ loose-type optical fiber cables for general use.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

The sensor according to the present invention can be used in strain sensing technology employing an optical fiber cable and can be applied to a strain detection system using Brillouin scattering light. More specifically, the sensor according to the present invention can be applied to a system for measuring and detecting the deformations of various structures or the like and ambient temperature.

The invention claimed is:

1. A sensor comprising:
a laser light source emitting a laser light with a predetermined wavelength;
a sensor section including at least first and second waveguides each transmitting part of the laser light from said laser light source therethrough, and having a holding structure for holding both said first and second waveguides while said first and second waveguides are arranged in parallel, wherein a spectrum change of Brillouin scattering light occurring in said first waveguide is different from a spectrum change of Brillouin scattering light occurring in second waveguide while a disturbance is applied thereto;
a detecting section detecting the spectra of Brillouin scattering light that is outputted from said first and second waveguides respectively in response to the input of the laser light; and
an analyzing section determining a measurement value of at least one of a temperature in said sensor section and a strain generated in said sensor section under the effect of disturbance, based on fluctuations of parameters defining the respective spectra of Brillouin scattering light from said first and second waveguides detected by said detecting section.

2. A sensor according to claim 1, wherein said sensor section includes, as said first and second waveguides, at least two types of waveguides that have Brillouin scattering characteristics that vary differently in response to the same disturbance.

3. A sensor according to claim 1, wherein said sensor section includes a first optical fiber that has a core region corresponding to said first waveguide and a cladding region provided on an outer periphery of said core region, and a second optical fiber that has a core region corresponding to said second waveguide and a cladding region provided on an outer periphery of said core region.

4. A sensor according to claim 1, wherein said sensor section includes an optical fiber that has a first core region corresponding to said first waveguide, a second core region corresponding to said second waveguide, and a common cladding region provided so as to cover said first and second core regions.

5. A sensor according to claim 2, wherein said first and second waveguides in said sensor section have Brillouin scattering characteristics that differ in the temperature dependency concerning peak frequency of a spectrum of Brillouin scattering light.

6. A sensor according to claim 5, wherein said first and second waveguides in said sensor section have Brillouin scattering characteristics that differ in an extremal temperature in a graph showing the temperature dependency of the peak frequency.

7. A sensor according to claim 2, wherein said first and second waveguides in said sensor section have Brillouin scattering characteristics that differ in the temperature dependency concerning line width of a spectrum of Brillouin scattering light.

8. A sensor according to claim 3, wherein said sensor section has a loop structure for optically connecting an end of said first waveguide, opposing another end of said first waveguide into which part of the laser light is inputted, onto an end of said second waveguide, opposing another end of said second waveguide into which part of the laser light is inputted.

9. A sensor according to claim 2, wherein the holding structure of said sensor section causes substantially identical strains to be generated in said first and second waveguides when an external force is applied thereto.

10. A sensor according to claim 9, wherein the holding structure of said sensor section includes a strength member that extends along a longitudinal direction of said first and second waveguides, and a coating layer that integrally covers said first and second waveguides together with said strength member.

11. A sensor according to claim 1, wherein the holding structure of said sensor section makes at least one of temperature in said sensor section and strain generated in said sensor section differ between said first and second waveguides.

12. A sensor according to claim 11, wherein the holding structure of said sensor section includes a loose structure in one of said first and second waveguides.

13. A sensor according to claim 12, wherein the holding structure of said sensor section includes one of a tube and a tube filled with a resin, accommodating one of said first and second waveguides.

14. A sensor according to claim 11, wherein the holding structure of said sensor includes a thermally insulating material covering an outer periphery of one of said first and second waveguides.

15. A sensor according to claim 3, wherein the holding structure of said sensor section is capable of partially separating said first optical fiber and second optical fiber.

16. A sensor according to claim 1, wherein said analyzing section extracts frequency information concerning a variation of spectrum peak frequency induced by a disturbance applied said the sensor section based on the spectra of Brillouin scattering light of said first and second waveguides detected by said detecting section, and then determines the physical quantity corresponding to at least one of the temperature in said sensor section and strain generated in said sensor section, based on the extracted frequency information.

17. A sensor according to claim 1, wherein said analyzing section extracts a line width variation of the spectrum induced by a disturbance applied to said sensor section based on the spectra of Brillouin scattering light of said first and second waveguides detected by said detecting section, and then determines the physical quantity corresponding to at least one of the temperature in said sensor section and strain generated in said sensor section, based on the extracted line width variation.

18. A disturbance measurement method using a sensor according to claim 1, comprising the steps of:

guiding a laser light with a predetermined wavelength, emitted from said laser light source, into said first and second waveguides included in said sensor section;

detecting spectra of the Brillouin scattering light of said first and second waveguides detected by said detecting section; and determining, in said analyzing section, at least one measurement value of the temperature in said sensor section and strain generated in said sensor in said sensor section, based on fluctuations of parameters defining the spectra of the Brillouin scattering light of said first and second waveguides detected by said detecting section.

19. A measurement method according to claim 18, wherein the parameters defining the spectrum of the Brillouin scattering light include at least one of peak frequency and line width of the spectrum.

* * * * *